(12) United States Patent
Nagase et al.

(10) Patent No.: US 8,408,353 B2
(45) Date of Patent: Apr. 2, 2013

(54) VEHICLE STEERING APPARATUS

(75) Inventors: Shigeki Nagase, Nabari (JP); Ken Matsubara, Matsubara (JP); Minoru Sentoku, Kashiba (JP); Kunihiro Oka, Kashihara (JP); Motoo Nakai, Nara (JP); Kouya Yoshida, Toyota (JP); Nobuhiro Uchida, Toyota (JP); Naotake Kanda, Yamatokoriyama (JP)

(73) Assignee: JTEKT Corporation, Osaka (JP)

( * ) Notice: Subject to any disclaimer, the term of this patent is extended or adjusted under 35 U.S.C. 154(b) by 194 days.

(21) Appl. No.: 12/867,487

(22) PCT Filed: Feb. 9, 2009

(86) PCT No.: PCT/JP2009/000509
§ 371 (c)(1),
(2), (4) Date: Aug. 12, 2010

(87) PCT Pub. No.: WO2009/101788
PCT Pub. Date: Aug. 20, 2009

(65) Prior Publication Data
US 2011/0000737 A1    Jan. 6, 2011

(30) Foreign Application Priority Data

Feb. 12, 2008   (JP) ................................. 2008-031112
Feb. 12, 2008   (JP) ................................. 2008-031116
Mar. 31, 2008   (JP) ................................. 2008-091653
Mar. 31, 2008   (JP) ................................. 2008-091658

(51) Int. Cl.
*B62D 5/04*          (2006.01)
(52) U.S. Cl. ........................................ 180/444; 180/443
(58) Field of Classification Search ................. 180/443, 180/444, 446
See application file for complete search history.

(56) References Cited

U.S. PATENT DOCUMENTS 6,268,669 B1    7/2001   Wakao et al.
6,577,030 B2    6/2003   Tominaga et al.
(Continued)

FOREIGN PATENT DOCUMENTS

JP    07-111758 A    4/1995
JP    07-137644 A    5/1995
(Continued)

OTHER PUBLICATIONS

European Search Report dated Sep. 12, 2012, that was issued in connection with the corresponding European patent application No. 09711118.1.

*Primary Examiner* — Anne Marie Boehler
*Assistant Examiner* — Maurice Williams
(74) *Attorney, Agent, or Firm* — Rabin & Berdo, P.C.

(57) ABSTRACT

Disclosed is a vehicle steering apparatus (1; 301) equipped with a control device (12; 322) which controls the actuation of an electric motor (18; 317). First and second housings (23, 24; 325, 312), which are in contact with each other, partition off an accommodation chamber (100; 324) which contains the control device (12; 322). The first housing (23; 325) is at least one part of the motor housing (25; 323). The first housing (23; 325) includes a first interior wall surface (101; 401) which partially partitions the accommodation chamber (100; 324). The second housing (24; 312) includes a second interior wall surface (102; 402) which partially partitions the accommodation chamber (100; 324). The first and the second interior wall surfaces (101, 102; 401, 402) are opposite each other with respect to the axial direction (X1) of a rotatable shaft (37; 352) of an electric motor (18; 317). The second interior wall surface (102; 402) includes the flat annular surface that surrounds a central axis (C1) of the rotatable shaft (37; 352) and an extension (C2) of the central axis (C1). The flat circular surface is orthogonal to the central axis (C1) and the extension (C2) of same.

17 Claims, 20 Drawing Sheets

U.S. PATENT DOCUMENTS

| | | |
|---|---|---|
| 7,100,734 B2 * | 9/2006 | Segawa .................. 180/444 |
| 2002/0060105 A1 | 5/2002 | Tominaga et al. |
| 2003/0188918 A1 | 10/2003 | Shimizu et al. |
| 2004/0026160 A1 * | 2/2004 | Shimizu et al. .............. 180/444 |
| 2004/0065163 A1 | 4/2004 | Takahashi et al. |
| 2004/0149512 A1 * | 8/2004 | Tsutsui et al. ............... 180/443 |
| 2004/0163879 A1 * | 8/2004 | Segawa .................. 180/444 |
| 2005/0178608 A1 * | 8/2005 | Shiino et al. ................. 180/444 |
| 2006/0108884 A1 | 5/2006 | Shiino et al. |
| 2007/0205039 A1 * | 9/2007 | Imagaki et al. ............... 180/444 |
| 2007/0251758 A1 * | 11/2007 | Segawa et al. ............... 180/444 |
| 2008/0006472 A1 * | 1/2008 | Song et al. ................... 180/444 |
| 2008/0211356 A1 * | 9/2008 | Kataoka et al. ............ 310/68 B |
| 2009/0266640 A1 | 10/2009 | Oshima et al. |

FOREIGN PATENT DOCUMENTS

| | | |
|---|---|---|
| JP | 09-030432 A | 2/1997 |
| JP | 2000-168583 A | 6/2000 |
| JP | 2000-190856 A | 7/2000 |
| JP | 2002-079951 A | 3/2002 |
| JP | 2002-120739 A | 4/2002 |
| JP | 2002-345211 A | 11/2002 |
| JP | 2003-113909 A | 4/2003 |
| JP | 2003-291830 A | 10/2003 |
| JP | 2004-135492 A | 4/2004 |
| JP | 2005-306141 A | 11/2005 |
| JP | 3774624 A1 | 2/2006 |
| JP | 2006-168705 A | 6/2006 |
| JP | 3886278 A | 12/2006 |
| JP | 2007-049777 A | 2/2007 |
| WO | WO-99-16654 A1 | 4/1999 |
| WO | WO-2007-055296 A1 | 5/2007 |

* cited by examiner

VEHICLE STEERING APPARATUS

TECHNICAL FIELD

The present invention relates to a vehicle steering apparatus.

BACKGROUND ART

Electric power steering apparatuses serving as vehicle steering apparatus assist drivers in steering by electric motors. More specifically, various types of sensors and others detect the steered states of steering members, for example, and control devices control electric motors based on the results of the detection of the steered states so that steering assist forces are applied to steering mechanisms.

It has been proposed that a control device is arranged between an electric motor and a speed reduction mechanism in an axial direction of the electric motor (see, e.g., Patent Documents 1 to 4).

An electric power steering apparatus that houses a control device at a position opposite to a speed reduction mechanism in an axial direction of a rotatable shaft in an electric motor within a case of the electric motor has been proposed (see, e.g., Patent Document 5).

An electric power steering apparatus in which a worm shaft in a speed reduction mechanism and a rotatable shaft in an electric motor are integrated with each other has been proposed (see, e.g., Patent Document 6).

In the electric power steering apparatus discussed in Patent Document 1, there is provided, between a motor housing in the electric motor and a gear housing in the speed reduction mechanism, a circuit case separate from both the housings, and the circuit case houses the control device. In Patent Document 1, a rotatable shaft in the electric motor and a worm shaft are connected to each other via a coupling having a spline, and the coupling is arranged in close proximity to the control device.

In the electric power steering apparatus discussed in Patent Document 2, a motor case in the electric motor includes a case on the motor main body side and a case on the substrate side connected to a gear housing, and a controller accommodation chamber is defined between the case on the substrate side and the gear housing.

In the electric power steering apparatus discussed in Patent Document 3, a common case is interposed between a motor housing and a gear housing. A motor chamber is defined between the case and the motor housing, and a controller accommodation chamber is defined between the case and the gear housing. In Patent Document 3, a rotatable shaft in the electric motor and a worm shaft are connected to each other via a torque limiter, and the torque limiter is arranged in close proximity to the control device. A bearing that supports the worm shaft, for example, is arranged in close proximity to the control device in addition to the coupling and the torque limiter.

[Patent Document 1] JP 2002-120739 A
[Patent Document 2] JP 2004-135492 A
[Patent Document 3] JP 2000-190856 A
[Patent Document 4] WO99/16654 Pamphlet
[Patent Document 5] JP 2002-345211 A
[Patent Document 6] JP 7-137644 A

DISCLOSURE OF THE INVENTION

Problems to be Solved by the Invention

In the electric power steering apparatus discussed in Patent Document 1, the circuit case is interposed between the motor housing and a gear case. Therefore, the electric power steering apparatus increases in size in the axial direction of the electric motor. Thus, the electric power steering apparatus may interfere with another component when mounted on a vehicle.

In the electric power steering apparatuses discussed in Patent Documents 2 and 3, the gear housing has an interior wall surface opposite to the axial direction of the electric motor in a controller accommodation chamber. The interior wall surface of the gear housing has a shape that partially protrudes toward the controller accommodation chamber.

Therefore, the controller accommodation chamber increases in size as a whole in the axial direction of the electric motor. Therefore, the electric power steering apparatus increases in size. Thus, the electric power steering apparatus may interfere with another component when mounted on a vehicle.

In the electric power steering apparatuses discussed in Patent Documents 1 and 3, a bearing that supports the worm shaft, for example, is arranged in close proximity to the control device in addition to the coupling and the torque limiter. Therefore, abrasion powder produced with work for adjusting the pressurization of the bearing may adversely affect the operation of the control device when it reaches the vicinity of the control device.

Means for Solving the Problems

The present invention is directed to providing a vehicle steering apparatus that is small in size and is superior in properties for loading in a vehicle. The present invention is directed to providing a vehicle steering apparatus that is small in size and is high in reliability.

According to an aspect of the present invention, a vehicle steering apparatus includes an electric motor including a cylindrical motor housing and a rotatable shaft, a control device that controls the driving of the electric motor, and a first housing and a second housing that define an accommodation chamber that accommodates the control device and contact each other, in which the first housing is at least a part of the motor housing, the first housing includes a first interior wall surface that partially partitions the accommodation chamber, the second housing includes a second interior wall surface that partially partitions the accommodation chamber, and the first interior wall surface and the second interior wall surface are opposite to each other in an axial direction of the rotatable shaft.

According to the present embodiment, the first housing that is at least a part of the motor housing and the second housing that contacts the first housing constitute the accommodation chamber that contains the control device. More specifically, no other housing is interposed between the first and second housings. Therefore, the vehicle steering apparatus can be miniaturized.

The second interior wall surface may include an annular plane that surrounds a central axis of the rotatable shaft or an extension of the central axis, and the annular plane may be perpendicular to the central axis of the rotatable shaft or the extension of the central axis. More specifically, the second interior wall surface in the second housing that partially partitions the accommodation chamber includes the annular plane, and the annular plane is perpendicular to the central axis of the rotatable shaft in the electric motor, for example, and surrounds the central axis. Therefore, there is no unnecessary protrusion into the accommodation chamber in the axial direction of the rotatable shaft in the electric motor. Even if the accommodation chamber is small in size in the axial direction of the rotatable shaft in the electric motor, therefore, a sufficient inner volume can be ensured as the accommodation chamber. As a result, the vehicle steering apparatus can be made as small in size as possible.

The vehicle steering apparatus may further include a transmission mechanism that transmits power from the electric motor to a steering mechanism, and a transmission mechanism housing that houses the transmission mechanism, in which the second housing may be provided in the transmission mechanism housing. The control device usually includes a heat generation element such as a switching element mounted on the power substrate. On the other hand, the transmission mechanism hardly generates heat. Heat from the heat generation element can be effectively released from the interior of the accommodation chamber to the outside via the transmission gear housing that houses the transmission mechanism.

The vehicle steering apparatus may further include a steered state detection sensor for detecting a steered state, and a sensor housing that houses the steered state detection sensor, in which the second housing may be provided in the sensor housing. In this case, heat from the heat generation element such as the switching element can be effectively released from the interior of the accommodation chamber to the outside via the sensor housing that houses the steered state detection sensor.

The second housing may include a cylindrical section that surrounds a shaft for transmitting a steering force, the cylindrical section may be arranged within the accommodation chamber, and an extension surface of the annular plane may contact or intersect an outer peripheral surface of the cylindrical section. The shaft for transmitting the steering force includes a steering shaft connected to a steering member, and a pinion shaft or a rack shaft in a rack-and-pinion mechanism serving as a steering mechanism. The accommodation chamber is arranged sufficiently closer to the steering shaft, for example, in the axial direction of the rotatable shaft in the electric motor so that the vehicle steering apparatus can be made more smaller in size in the axial direction of the rotatable shaft in the electric motor.

The control device may be arranged around the central axis of the rotatable shaft or the extension of the central axis. In this case, an inner space of the accommodation chamber can be effectively used to arrange the control device and thus, the vehicle steering apparatus can be made smaller in size in the axial direction of the rotatable shaft in the electric motor.

The first housing may include a partition wall that separates the accommodation chamber and the inside of the motor housing, the partition wall may be provided with the first interior wall surface, the control device may include a power substrate for supplying power to the electric motor, the power substrate may be arranged in closer proximity to the first interior wall surface than to the second interior wall surface, the partition wall may include a thick-walled section having a relatively large thickness and a thin-walled section having a relatively small thickness in the axial direction of the rotatable shaft, and the power substrate may be arranged in close proximity to or in contact with the thick-walled section. In this case, heat from the power substrate having the heat generation element can be effectively released from the first housing toward the second housing that contacts the first housing using the thick-walled section of the partition wall in the first housing as a heat sink.

The vehicle steering apparatus may further include a steering mechanism that is driven by the electric motor via a transmission mechanism, in which at least a part of a housing that houses at least a part of the steering mechanism and the first housing may be integrally formed of a single material. In this case, at least a part of the housing that houses at least a part of the steering mechanism and at least a part of the motor housing are combined with each other. Therefore, the number of components can be reduced so that the configuration can be simplified. Therefore, at least a part of the motor housing can be substantially used for the accommodation chamber that accommodates the control device. At least respective parts of both the housings are integrally formed so that the whole rigidity of the housing can be significantly improved, and the vibration can be reduced. The degree of parallelization between the rotatable shaft supported by the motor housing and the steered shaft supported directly or indirectly by the housing that houses at least a part of the steering mechanism can be improved. From this viewpoint, the vibration can also be reduced. Thermal conductivity between both the housings can be improved more significantly than when both the housings are respectively composed of separate members. When both the housings are used to release heat from the heat generation element, therefore, the heat can be satisfactory released.

The vehicle steering apparatus may further include a transmission mechanism housing that houses the transmission mechanism and has an opening, in which the first housing may be connected to the transmission mechanism housing to cover the opening of the transmission mechanism housing. In this case, the motor housing can close the opening of the transmission mechanism housing. Therefore, the number of components can be made smaller than when a cover is separately provided. The transmission mechanism hardly generates heat. Therefore, heat from the heat generation element, for example, can be effectively released via the transmission mechanism housing.

The housing that houses at least a part of the steering mechanism may house a steered shaft. In this case, the degree of parallelism of the steered shaft and the rotatable shaft in the electric motor can be ensured with high accuracy.

The motor housing may include a cylindrical section formed of a material including aluminum, the electric motor may include a rotor that rotates together with the rotatable shaft, and a stator opposite to the rotor, the stator may include an annular stator core integrally formed of a single material, and the stator core may be fitted in the inner periphery of the cylindrical section in the motor housing. In this case, the electric power steering apparatus can be easily assembled by using a so-called integrated stator core. The position accuracy of poles of the stator can be improved, so that the efficiency of the electric motor can be improved.

The vehicle steering apparatus may further include a transmission mechanism that transmits power from the electric motor to a steering mechanism, a transmission mechanism housing that houses the transmission mechanism, and a preload applying mechanism, in which the transmission mechanism may include a driving member coaxially connected to the rotatable shaft together rotatably via a connection member, and a driven member that is driven by the driving member, the driving member may include a first end relatively closer to the rotatable shaft, and a second end relatively farther from the rotatable shaft, the first end of the driving member may be rotatably supported by a first bearing held in the transmission mechanism housing, the second end of the driving member may be rotatably supported by a second bearing held in the transmission mechanism housing, the preload applying mechanism may press the second bearing, to apply a preload the first bearing and the second bearing, the second housing may be provided in the transmission mechanism housing, the electric motor may include a rotor that rotates together with the rotatable shaft, and a stator opposite to the rotor, and the control device may be arranged between the rotor and the first bearing in the axial direction of the rotatable shaft.

In this case, the control device is arranged between the first bearing that supports the first end of the driving member, which is relatively closer to the rotatable shaft, and the rotor in the electric motor. The preload applying mechanism that applies the preload to the first and second bearings presses the second bearing that supports the second end of the driving member, which is sufficiently spaced apart from the control device in the axial direction of the rotatable shaft. More specifically, the preload applying mechanism is arranged in close proximity of the second end of the driving member. Even if abrasion powder or the like is generated from the preload applying mechanism in pressurization adjustment work performed when the vehicle steering apparatus is assembled, therefore, the abrasion powder does not reach the vicinity of the control device. As a result, the reliability of the control device can be improved.

The preload applying mechanism may include a preload applying member including a first screw section provided in the transmission mechanism housing and a second screw section that is fitted in the first screw section. In this case, the pressurization of the first and second bearings is adjusted by adjusting an amount of screw-in by the screw section in the preload applying member. The abrasion powder that may be produced with the screw-in does not reach the vicinity of the control device. Therefore, the reliability of the control device is improved.

The connection member may include a nonmetallic insulating material. Even if the nonmetallic insulating member is damaged after the vehicle steering apparatus is shipped, to enter the vicinity of the control device, there is no possibility of electric failure. Therefore, the reliability of the control device can be improved.

The accommodation chamber may be defined between the transmission mechanism housing and the first housing, and the preload applying mechanism may be arranged outside the accommodation chamber. In this case, even if abrasion powder or the like is produced from the preload applying mechanism in pressurization adjustment work performed when the vehicle steering apparatus is assembled, therefore, the abrasion powder does not enter the accommodation chamber. Therefore, the reliability of the control device can be significantly improved.

The rotatable shaft may include an end connecting to the connection member, the end of the rotatable shaft may be rotatably supported by a third bearing held in the motor housing, the control device may include a power substrate having a power circuit for supplying power to the electric motor mounted thereon, and the power substrate may be arranged between the third bearing and the rotor in the axial direction of the rotatable shaft. The rotatable shaft may include an end connecting to the connection member, the end of the rotatable shaft may be rotatably supported by a third bearing held in the motor housing, the control device may include a power substrate having a power circuit for supplying power to the electric motor mounted thereon, and at least a part of the power substrate and at least a part of the second bearing may be arranged at positions that overlap each other in the axial direction of the rotatable shaft.

In these cases, the power substrate can be sufficiently separated from the preload applying mechanism in the axial direction of the rotatable shaft in the electric motor. Even if abrasion powder or the like is produced from the preload applying mechanism in preload adjustment work performed when the vehicle steering apparatus is assembled, therefore, the abrasion powder does not reach the vicinity of the power substrate. Therefore, the reliability of the control device can be further improved.

The vehicle steering apparatus may further include a transmission mechanism that transmits power from the electric motor to a steering mechanism, in which the transmission mechanism may include a driving member, and a driven member that is driven by the driving member, the driving member and the rotatable shaft may constitute an integrated shaft integrally formed of a single material, the control device may include a control substrate including a region having a control circuit for controlling the power circuit mounted thereon, and the region in the control substrate may be arranged around the integrated shaft. In this case, the driving member and the rotatable shaft in the electric motor can be integrally formed of a single member. Therefore, a coupling for connecting the driving member and the rotatable shaft to each other need not separately be provided. As a result, the vehicle steering apparatus can be miniaturized. The control circuit can overlap the integrated shaft in the axial direction of the integrated shaft. Therefore, the vehicle steering apparatus can be further miniaturized.

The vehicle steering apparatus may further include a housing that houses the integrated shaft, in which the integrated shaft may include three portions spaced apart in the axial direction of the integrated shaft, and the three portions may be supported by the housing, respectively, via corresponding bearings. In this case, the integrated shaft is supported at its three points. Therefore, the number of points at which the integrated shaft is supported can be made smaller than when each of the member on the driving side and the rotatable shaft in the electric motor is supported at both its ends. Therefore, further light weight of the vehicle steering apparatus and improvement in the degree of freedom of a layout within the housing that houses the integrated shaft can be achieved.

The driving member may include a worm shaft, the worm shaft may include a first end relatively closer to the electric motor, and a second end relatively farther from the electric motor, and a part of the housing that houses the integrated shaft may include a driving member housing that houses the worm shaft serving as the driving member, and the vehicle steering apparatus may further include a sealing member that seals an area between the first end of the worm shaft and the driving member housing. In this case, a lubricant or the like in the driving member housing can be prevented from flowing toward the control device.

The worm shaft may include a first end relatively closer to the electric motor, and a second end relatively farther from the electric motor, and the rotatable shaft may include a first end relatively closer to the driving member, and a second end relatively farther from the driving member, the vehicle steering apparatus may include a bearing that is held by the transmission mechanism housing and supports the second end of the driving member, a bearing that is held by the first housing and supports the first end of the rotatable shaft, and a preload applying mechanism that presses the bearing that supports the second end of the driving member, to apply a preload the bearing that supports the second end of the driving member and the bearing that supports the first end of the rotatable shaft, in which the second housing may be provided in the transmission mechanism housing, the electric motor may include a rotor that rotates together with the rotatable shaft, and a stator opposite to the rotor, and the control device may be arranged between the rotor and the first bearing in the axial direction of the rotatable shaft.

In this case, the preload applying mechanism presses the bearing that supports the second end of the driving member, which is sufficiently spaced apart from the control device in the axial direction of the rotatable shaft. More specifically, the preload applying mechanism is arranged in close proximity of the second end of the driving member. Even if the abrasion powder or the like is produced from the preload applying mechanism in preload adjustment work performed when the vehicle steering apparatus is assembled, therefore, the abrasion powder does not reach the vicinity of the control device. As a result, the reliability of the control device can be improved.

The vehicle steering apparatus may further include an urging member that urges the driving member toward the driven member. In this case, backlash causing driving noise can be prevented from occurring between respective engaging portions of the driving member and the driven member.

The control substrate may have an insertion hole through which the integrated shaft is inserted, and the integrated shaft may include a thin shaft section arranged within the insertion hole, and a pair of thick shaft sections arranged on both sides with the thin shaft section sandwiched therebetween in the axial direction of the integrated shaft. In this case, the thin shaft section of the integrated shaft is inserted through the insertion hole in the control substrate. Therefore, the insertion hole of the control substrate can be made as small in size as possible. As a result, a larger mounting area of the control substrate can be ensured. Moreover, the size of the control substrate need not be increased outward.

The insertion hole may open at an edge of the control substrate. In this case, the thin shaft section of the integrated shaft can be inserted through the insertion hole of the control substrate from the edge on the side of the control substrate.

DESCRIPTION OF SYMBOLS

Figure 1:
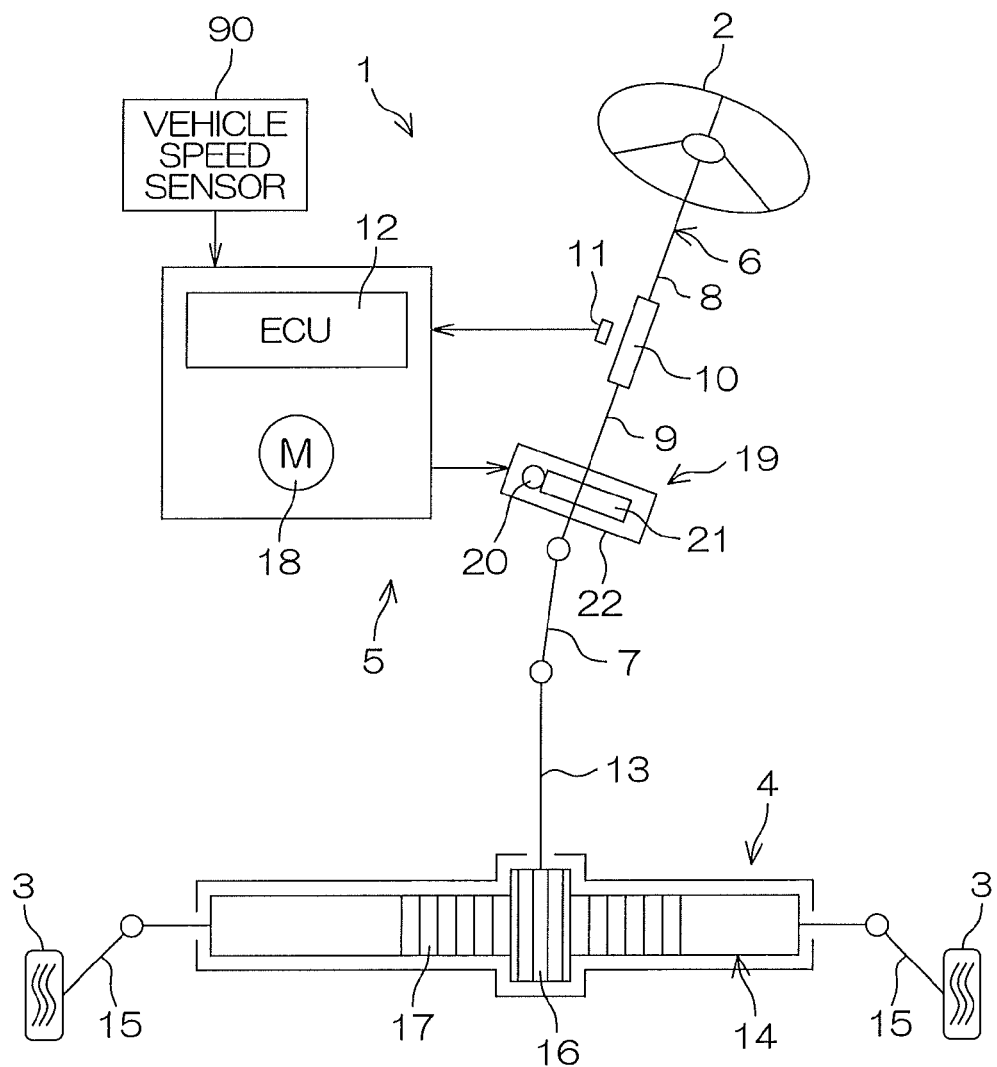
FIG. 1 is a schematic view illustrating the schematic configuration of an electric power steering apparatus serving as a vehicle steering apparatus according to an embodiment of the present invention.

1 . . . electric power steering apparatus (vehicle steering apparatus), 4 . . . steering mechanism, 5 . . . steering assist mechanism, 6 . . . steering shaft (shaft for transmitting a steering force), 11 . . . torque sensor (steered state detection sensor), 12 . . . ECU (control device), 13 . . . pinion shaft (shaft for transmitting a steering force), 14 . . . rack shaft (steered shaft, shaft for transmitting a steering force), 18 . . . electric motor, 19 . . . speed reduction mechanism (transmission mechanism), 20 . . . worm shaft (driving gear, driving member), 20a . . . first end, 20b . . . second end, 21 . . . worm wheel (driven gear, driven member), 22 . . . gear housing (transmission mechanism housing), 23 . . . first housing, 24 and 24A . . . second housing, 25 . . . motor housing, 26 . . . motor housing main body (cylindrical section of a motor housing), 27 . . . driving gear housing (driving member housing), 28 . . . driven gear housing (cylindrical section that surrounds a shaft for transmitting a steering force, a driven member housing), 28a . . . outer peripheral surface, 35 and 35A . . . sensor housing, 37 . . . rotatable shaft, 37a . . . first end, 37b . . . second end, 38 . . . connection member, 45 . . . first bearing, 47 . . . second bearing, 56 . . . first screw section, 64 . . . rotor, 65 . . . stator, 68 . . . stator core, 70 . . . motor chamber, 75 . . . third bearing, 77 . . . partition wall, 77a . . . thick-walled section, 77b . . . thin-walled section, 78 . . . power substrate, 79 . . . control substrate, 83 . . . FET, 84 . . . control circuit, 84A . . . region having a control circuit mounted thereon, H . . . housing, 100 . . . accommodation chamber, 101 . . . first interior wall surface, 102 . . . second interior wall surface, X1 . . . axial direction (of a rotatable shaft), C1 . . . central axis, C2 . . . extension, P1 . . . extension surface, P2 . . . cylindrical surface, 200 . . . preload applying mechanism, 204 and 204A . . . integrated shaft, 206 . . . thin shaft section, 207 and 208 . . . thick shaft section, 209 . . . insertion hole, 209a . . . main section, 209b . . . slit, 210 . . . urging member, 218 . . . edge, 450 . . . sealing member, 750 . . . bearing that supports a second end of a rotatable shaft, 760 . . . bearing that supports a first end of a rotatable shaft, 301 . . . electric power steering apparatus (vehicle steering apparatus), 302 . . . steering member, 307 . . . steering mechanism, 308 . . . pinion shaft, 308a . . . pinion, 309 . . . steering shaft, 309a . . . rack, 309b screw shaft, 311 and 311A . . . unit housing (housing that houses at least a part of a steering mechanism), 312 . . . second housing (housing that houses a power transmission mechanism), 313 . . . third housing (housing that houses a steering mechanism), 315 . . . steerable wheel, 316 . . . steering assist mechanism, 317 . . . electric motor, 318 . . . power transmission mechanism, 319 . . . gear mechanism, 320 . . . motion conversion mechanism, 322 . . . ECU (control device), 323 and 323A . . . motor housing, 324 . . . accommodation chamber, 325 and 325A . . . first motor housing (first housing), 326 and 326A . . . second motor housing, 327 . . . rack housing (housing that houses a steering shaft), 328 . . . connection section, 331 . . . driving gear, 332 . . . intermediate gear, 333 . . . driven gear, 335 and 340 . . . housing hole, 335a and 340a . . . opening (opening of a transmission mechanism housing), 344 . . . rotatable cylinder, 345 and 346 . . . screw groove, 347 . . . ball, 352 . . . rotatable shaft, 353 . . . joint, 354 . . . rotor, 355 . . . stator, 358 and 580 . . . stator core, 359 . . . coil, 360 . . . motor chamber, 362 . . . rotational position detection device, 367 . . . partition wall, 367a . . . thick-walled section, 367b . . . thin-walled section, 373 . . . power substrate, 374 control substrate, 379 . . . power circuit, 380 . . . FET (heat generation element), 381 control circuit, 401 first wall surface, 402 . . . second wall surface, and 403 . . . seat section.

BEST MODE FOR CARRYING OUT THE INVENTION

Referring to the drawings, embodiments of the present invention will be specifically described.

FIG. 1 is a schematic view illustrating the schematic configuration of an electric power steering apparatus 1 serving as a vehicle steering apparatus according to an embodiment of the present invention.

Referring to FIG. 1, the electric power steering apparatus 1 includes a steering wheel 2 serving as a steering member, a steering mechanism 4 for steering steerable wheels 3 in synchronization with the rotation of the steering wheel 2, and a steering assist mechanism 5 for assisting a driver in steering. The steering wheel 2 and the steering mechanism 4 are mechanically connected to each other via a steering shaft 6 and an intermediate shaft 7.

Although in the present embodiment, the steering assist mechanism 5 applies an assist force (a steering assist force) to the steering shaft 6, the present invention can be applied to a configuration in which the steering assist mechanism 5 applies a assist force to a pinion shaft, described below, and a configuration in which the steering assist mechanism 5 applies an assist force to a rack shaft, described below.

The steering shaft 6 linearly extends. The steering shaft 6 includes an input shaft 8 connected to the steering wheel 2 and an output shaft 9 connected to an intermediate shaft 7. The input shaft 8 and the output shaft 9 are coaxially connected to each other relatively rotatably via a torsion bar 10. More specifically, when a steering torque having a predetermined value or more is input to the steering wheel 2, the input shaft 8 and the output shaft 9 rotate in the same direction while rotating relative to each other.

A torque sensor 11 serving as a steered state detection sensor arranged around the steering shaft 6 detects a steering torque input to the steering wheel 2 based on an amount of relative rotational displacement of the input shaft 8 and the output shaft 9. The result of the torque detection by the torque sensor 11 is input to an electronic control unit (ECU) 12 serving as a control device. The result of vehicle speed detection from a vehicle speed sensor 90 is input to the ECU 12.

The intermediate shaft 7 connects the steering shaft 6 and the steering mechanism 4 to each other.

The steering mechanism 4 is composed of a rack-and-pinion mechanism including a pinion shaft 13 and a rack shaft 14 serving as a steered shaft. The steerable wheels 3 are connected to each of ends of the rack shaft 14 via a tie rod 15 and a knuckle arm (not illustrated).

The pinion shaft 13 is connected to the intermediate shaft 7. The pinion shaft 13 rotates together with the steering of the steering wheel 2. A pinion 16 is provided at a tip end (a lower end in FIG. 1) of the pinion shaft 13.

The rack shaft 14 linearly extends in a right-and-left direction of an automobile. A rack 17, which meshes with the pinion 16 is formed halfway in an axial direction of the rack shaft 14. The pinion 16 and the rack 17 convert the rotation of the pinion shaft 13 into the axial movement of the rack shaft 14. The rack shaft 14 is moved in the axial direction so that the steerable wheels 3 can be steered.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 into the axial movement of the rack shaft 14. Thus, the steerable wheels 3 are steered.

The steering assist mechanism 5 includes an electric motor 18 for steering assist and a speed reduction mechanism 19 serving as a transmission mechanism for transmitting an output torque of the electric motor 18 to the steering mechanism 4. Examples of the speed reduction mechanism 19 include a skew gear mechanism such as a worm gear mechanism and a parallel gear mechanism. In the present embodiment, the worm gear mechanism is used as the speed reduction mechanism 19. More specifically, the speed reduction mechanism 19 includes a worm shaft 20 serving as a driving gear (a member that drives the transmission mechanism) and a worm wheel 21 serving as a driven gear (a member that is driven by the transmission mechanism), which meshes with the worm shaft 20. The speed reduction mechanism 19 is housed in a gear housing 22 serving as a transmission mechanism housing.

A rotatable shaft (not illustrated) in the electric motor 18 is connected to the worm shaft 20 via a joint (not illustrated). The electronic motor 18 drives to rotate the worm shaft 20. The worm wheel 21 is connected to the steering shaft 6 together rotatably. The worm shaft 20 drives to rotate the worm wheel 21.

When the electric motor 18 drives to rotate the worm shaft 20, the worm shaft 20 drives to rotate the worm wheel 21, and the worm wheel 21 and the steering shaft 6 together rotate. The rotation of the steering shaft 6 is transmitted to the pinion shaft 13 via the intermediate shaft 7. The rotation of the pinion shaft 13 is converted into the axial movement of the rack shaft 14. Thus, the steerable wheels 3 are steered. More specifically, the electric motor 18 drives to rotate the worm shaft 20 so that the steerable wheels 3 are steered.

The electric motor 18 is controlled by the ECU 12. The ECU 12 controls the electric motor 18 based on the result of torque detection from the torque sensor 11, the result of vehicle speed detection from the vehicle speed sensor 90, and so on. More specifically, the ECU 12 carries out control to use a map storing for each vehicle speed a relationship between a torque and a target assist amount to determine the target assist amount and bring an assist force generated by the electric motor 18 closer to the target assist amount.

Figure 2:
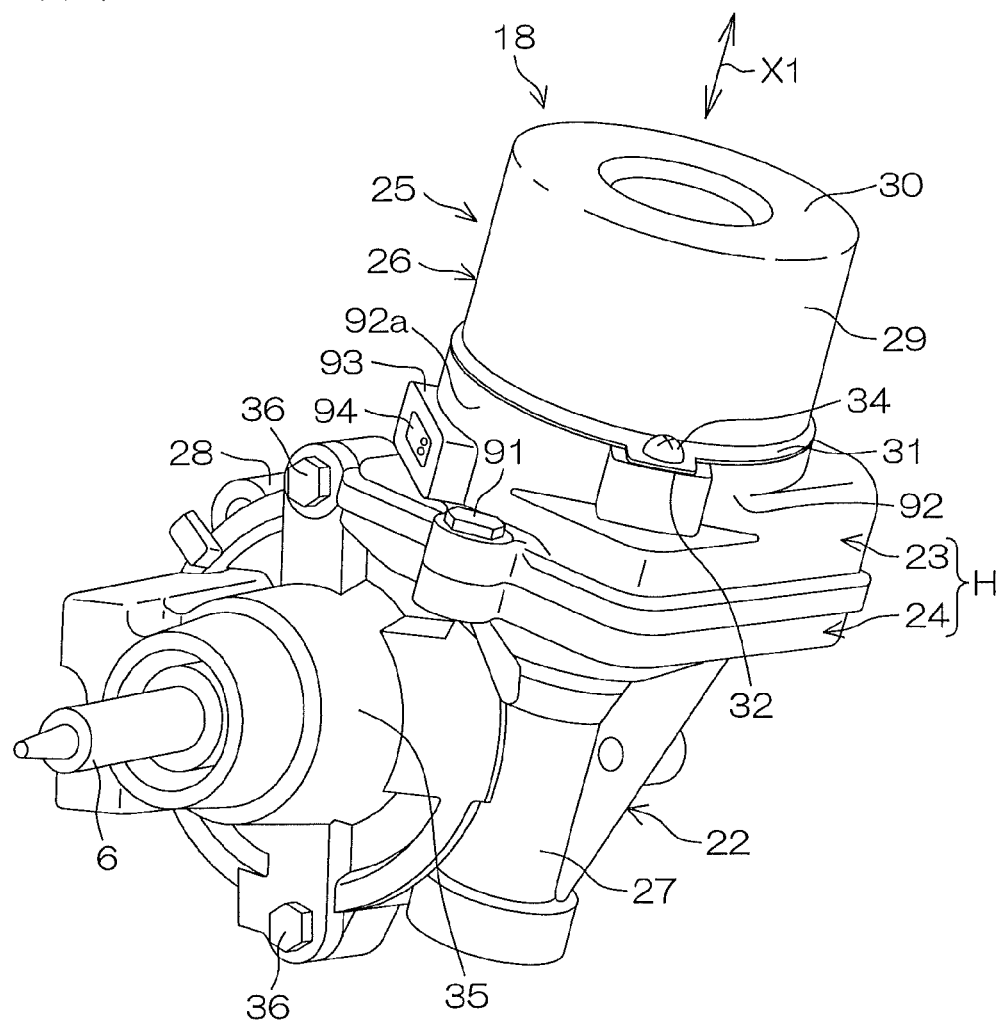
FIG. 2 is a schematic perspective view of a steering assist mechanism serving as a principal part of the electric power steering apparatus.
Figure 3:
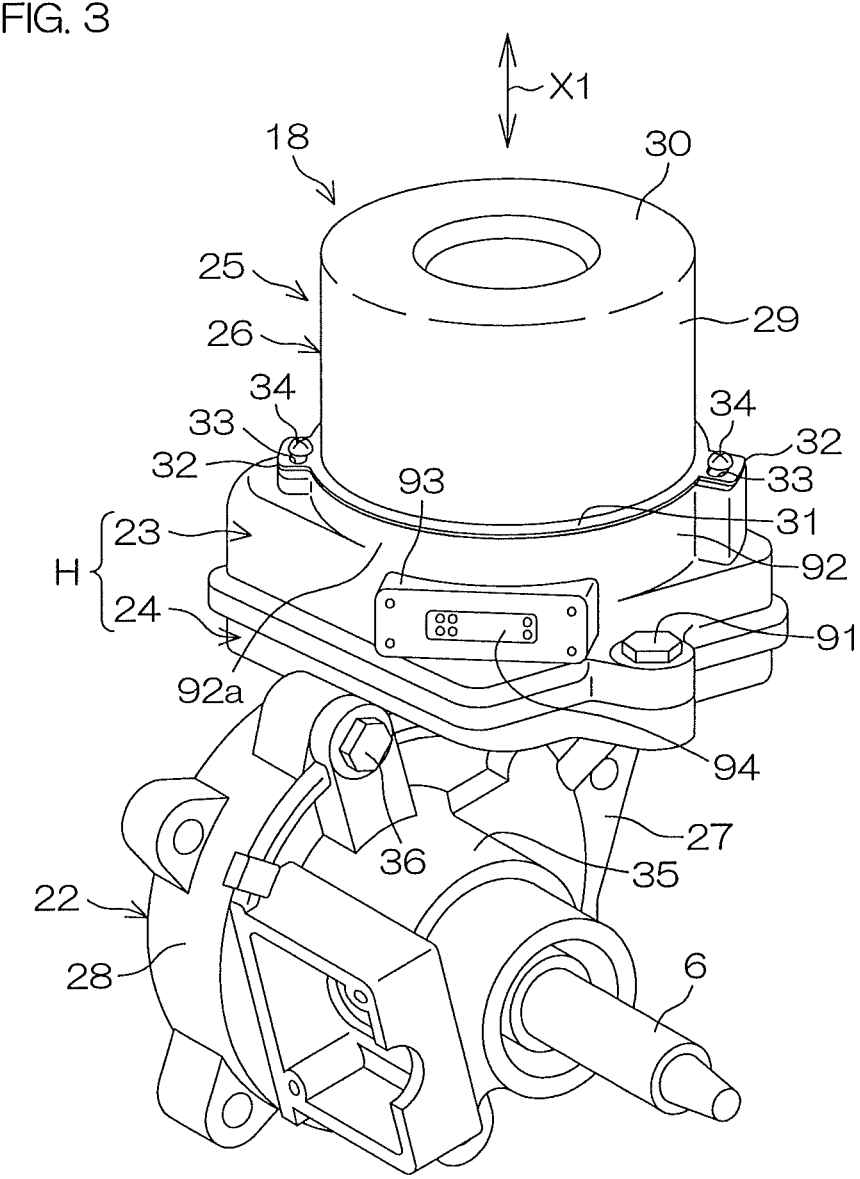
FIG. 3 is a schematic perspective view of the steering assist mechanism, as viewed from an angle different from that illustrated in FIG. 2.

FIGS. 2 and 3 are respectively schematic perspective views of the steering assist mechanism 5, as viewed from different angles. The present embodiment is mainly characterized in that a housing H for housing the above-mentioned ECU 12 serving as the control device includes a first housing 23 and a second housing 24, which contact each other (e.g., a state where their respective end surfaces abut on each other or a state where their respective ends are fitted to each other), as illustrated in FIGS. 2 and 3.

More specifically, the first housing 23 and the second housing 24, which constitute the housing H for housing the ECU 12, are in contact with each other. More specifically, the first housing 23 and the second housing 24 directly engage with each other, and no other housing is interposed between both the housings 23 and 24. This results in significant miniaturization.

Each of the first housing 23 and the second housing 24 is formed in a substantially square box shape whose one end opens. The respective ends of the first and second housings 23 and 24 abut on each other, and are fastened to each other by a fixing screw 91.

On the other hand, a motor housing 25 in the electric motor 18 includes a motor housing main body 26 serving as a cylindrical section and the above-mentioned first housing 23. More specifically, the first housing 23 that is a part of the housing H for housing the ECU 12 is formed of a single material integrally with at least a part of the motor housing 25 in the electric motor 12. In other words, at least a part of the motor housing 25 and a part of the housing H for housing the ECU 12 are combined with each other.

The gear housing 22 includes a driving gear housing 27 serving as a cylindrical driving member housing that houses the worm shaft 20, a driven gear housing 28 serving as a cylindrical driven member housing 28 that houses the worm wheel 21, and the above-mentioned second housing 24. More specifically, the second housing 24 that is a part of the housing H for housing the ECU 12 is formed of a single material integrally with the driving gear housing 27 and the driven gear housing 28 in the gear housing 22. In other words, a part of the gear housing 22 and a part of the housing H for housing the ECU 12 are combined with each other.

A cylindrical projection 93 is formed on the outer periphery 92a of an outer peripheral wall 92 serving as a sidewall of the first housing 23, and an electric connector 94 facing the outside of the first housing 23 is arranged within the cylindrical projection 93. The electric connector 94 is provided with a terminal for supplying power from a battery to the ECU 12 or a terminal for inputting and outputting a signal from the exterior, which is not illustrated.

Figure 4:
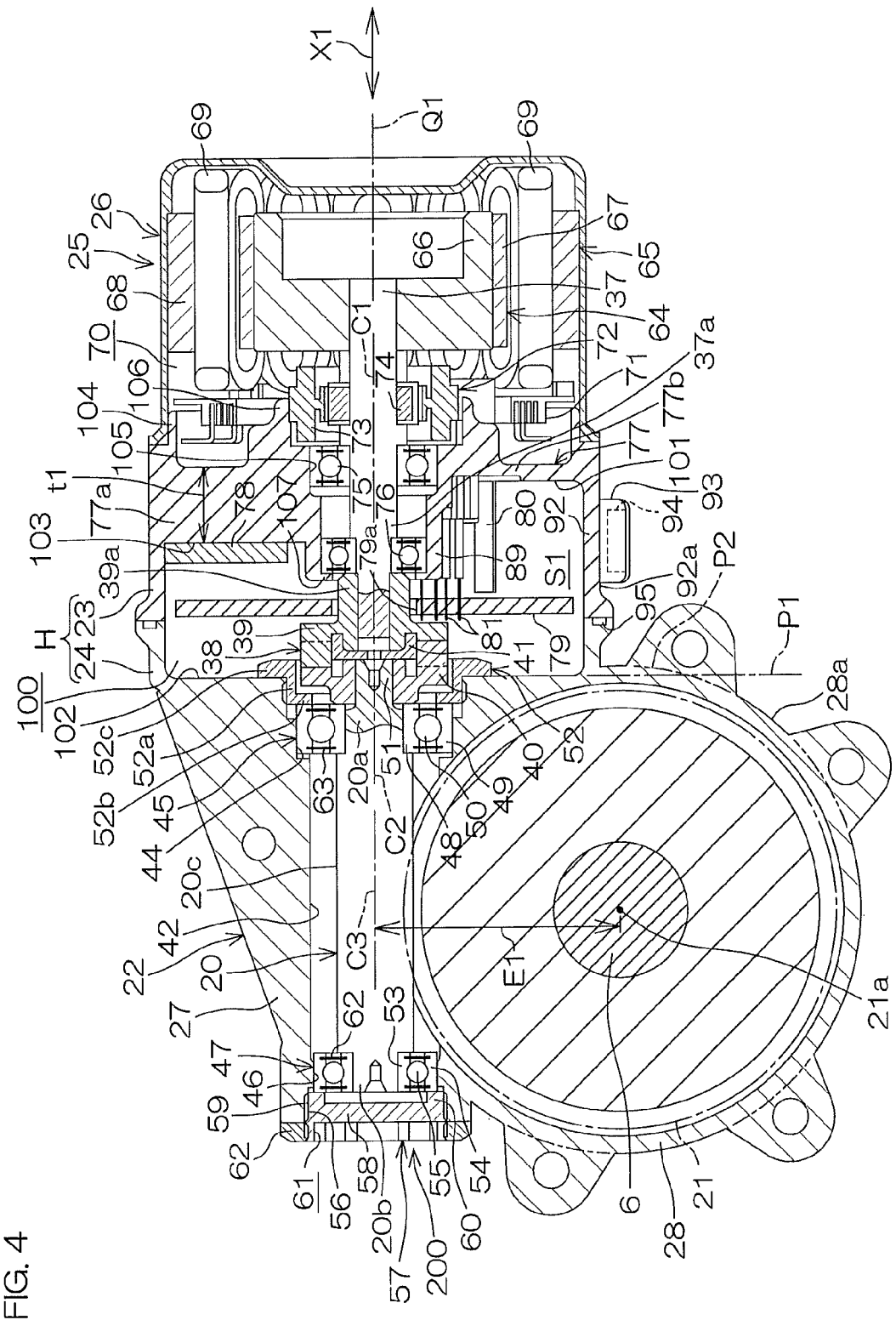
FIG. 4 is an illustrative sectional view of the steering assist mechanism, cut in an axial direction of an electric motor.

Referring to FIG. 4, which is a cross-sectional view of a principal part of the electric power steering apparatus 1, the worm wheel 21 serving as a driven member of the speed reduction mechanism 19 (transmission mechanism) and the electric connector 94 are arranged on the same side of a plane Q1 including a central axis C3 of the worm shaft 20 serving as a driving member of the speed reduction mechanism 19 (transmission mechanism) and parallel to a central axis 21a of the worm wheel 21. In this case, the electric connector 94 and the driven gear housing 28 project toward the same side, as viewed in an axial direction X1 of the rotatable shaft 37 in the electric motor 18. This enables substantial miniaturization and space saving, resulting in improvement in properties for loading in a vehicle.

Referring to FIG. 3, the electric power steering apparatus 1 is laid out so that at least respective parts of the electric connector 94 and the driven gear housing 28 overlap each other, as viewed in the axial direction X1 of the rotatable shaft 37, described below, in the electric motor 18. This enables substantial miniaturization and space saving, resulting in improvement in properties for loading in the vehicle.

The electric power steering apparatus 1 is laid out so that at least respective parts of the electric connector 94 and a sensor housing 35 overlap each other, as viewed in the axial direction X1 of the rotatable shaft 37. This enables substantial miniaturization and space saving, resulting in improvement in properties for loading in the vehicle.

The first housing 23 in the motor housing 25 is formed of an aluminum alloy (e.g., a casting or a cold forging), so that the steering assist mechanism 5 is made lightweight. The gear housing 22 including the driving gear housing 27, the driven gear housing 28, and the second housing 24 is formed of an aluminum alloy (e.g., a casting or a cold forging), for example, so that the steering assist mechanism 5 is made lightweight. A non-magnetic sheet metal, for example, is used for the motor housing main body 26 in the motor housing 25.

The motor housing main body 26 includes a cylindrical peripheral wall 29, a bottom wall 30 for closing one end of the peripheral wall 29, and an annular flange 31 that protrudes radially outward from the other end of the peripheral wall 29.

A bracket 32 that protrudes radially outward from a part in a circumferential direction of the annular flange 31. A fixing screw 34 inserted through a screw insertion hole 33 in a bracket 32 is screwed into a screw hole in the first housing 23 so that the motor housing main body 26 and the first housing 23 are integrally fixed to each other. The screw insertion hole 33 is formed into a long hole extending in a circumferential direction of the motor housing main body 26 so that a position in the circumferential direction of the motor housing main body 26 can be adjusted for the first housing 23.

The first housing 23 and the second housing 24, which constitute the housing H for housing the ECU 12, are fixed to each other using a fixing screw 91.

A cylindrical sensor housing 35 that houses the torque sensor 11 is connected to the driven gear housing 28 in the gear housing 22. The driven gear housing 28 and the sensor housing 35 are fixed to each other using a fixing screw 36. The steering shaft 6 is inserted through the cylindrical driven gear housing 28 and the sensor housing 35.

Referring to FIG. 4, the first housing 23 serving as the motor housing 25 in the electric motor 18 and the second housing 24 that contacts the first housing 23 constitute an accommodation chamber 100 that accommodates the ECU 12 serving as the control device. The respective end surfaces of the first housing 23 and the second housing 24 abut on each other, and an annular sealing member 95 seals an area between the end surfaces.

The sealing member 95 is housed in an annular groove 99 formed on an end surface 98 of either one of the first and second housings 23 and 24, e.g., the second housing 24, and is in contact with an end surface of the other housing, e.g., the first housing 23 (corresponding to an end surface 88a of a flange 88). An O ring, for example, can be used as the sealing member 95.

Referring to FIG. 4 again, the first housing 23 includes a first interior wall surface 101 that partially partitions the accommodation chamber 100. The second housing 24 includes a second interior wall surface 102 that partially partitions the accommodation chamber 100. The first interior wall surface 101 and the second interior wall surface 102 are opposite to each other in the axial direction X1 of the rotatable shaft 37 in the electric motor 18.

The second interior wall surface 102 in the second housing 24 is formed of an annular plane, and the annular plane is perpendicular to a central axis C1 of the rotatable shaft 37 in the electric motor 18 or an extension C2 of the central axis C1 (usually matched with the central axis C3 of the worm shaft 20) and surrounds the central axis C1 or the extension C2.

An extension surface P1 of the annular plane forming the second interior wall surface 102 intersects, as illustrated in FIG. 4, or contacts a cylindrical surface P2 forming a principal part of an outer peripheral surface 28a of the driven gear housing 28 serving as a cylindrical section that surrounds the steering shaft 6. More specifically, the driven gear housing 28 surrounds the worm wheel 21 in which the steering shaft 6 is fitted.

The ECU 12 serving as the control device is arranged around the central axis C1 of the rotatable shaft 37 or the extension C2.

The rotatable shaft 37 in the electric motor 18 and the worm shaft 20 are coaxially arranged. The rotatable shaft 37 and the worm shaft 20 are coaxially connected to each other so that power can be transmitted via a joint 38 interposed therebetween. The joint 38 includes an annular input member 39 that rotates together with the rotatable shaft 37 in the electric motor 18, an annular output member 40 that rotates together with the worm shaft 20, and an annular elastic member 41 interposed between the input member 39 and the output member 40 for connecting the input member 39 and the output member 40 to each other so that power can be transmitted. The elastic member 41 is composed of a nonmetallic insulating member, e.g., insulating rubber or insulating resin.

The worm shaft 20 is housed in a driving gear housing hole 42 in the driving gear housing 27 in the gear housing 22. The worm shaft 20 has a first end 20a and a second end 20b, and a worm 20c is formed in an intermediate portion in the axial direction of the worm shaft 20.

The first end 20a of the worm shaft 20 is rotatably supported by a first bearing 45 held in a bearing holding section 44 on the inner periphery at one end (an end on the side of the electric motor 18) of the driving gear housing hole 42. The second end 20b of the worm shaft 20 is rotatably supported by a second bearing 47 held in a bearing holding section 46 on the inner periphery at the other end of the driving gear housing hole 42.

The first bearing 45 is composed of a rolling bearing including an inner ring 48, an outer ring 49, and a plurality of rolling elements 50 interposed between the inner ring 48 and the outer ring 49. The inner ring 48 is held in the first end 20a of the worm shaft 20 together rotatably. One end surface of the inner ring 48 abuts on a positioning step provided on the outer periphery of the worm shaft 20. A small-diameter projection shaft 51 extends from the first end 20a of the worm shaft 20. The output member 40 in the joint 38 is fitted in the projection shaft 51 together rotatably and axially unmovably. The output member 40 abuts on the other end surface of the inner ring 48. The inner ring 48 is sandwiched between the positioning step in the worm shaft 20 and the output member 40. Thus, the axial movement of the inner ring 48 relative to the worm shaft 20 is regulated.

One end surface of the outer ring 49 is spaced a predetermined distance apart from and is opposite to a step adjacent to one side of the bearing holding section 44 in the driving gear housing hole 42. An annular fixing member 52 is screwed into a screw section adjacent to the other side of the bearing holding section 44 in the driving gear housing hole 42. The fixing member 52 presses the other end surface of the outer ring 49. Thus, the axial movement of the outer ring 49 is regulated. The fixing member 52 includes a cylindrical main body 52a having a screw section formed on its outer periphery, an inner flange 52b extending radially inward from one end of the main body 52a, and an outer flange 52c extending radially outward from the other end of the main body 52a. The inner flange 52b presses the other end surface of the outer ring 49. The outer flange 52c is pressed against the second interior wall surface 102 in the second housing 24 that partitions the accommodation chamber 100 that accommodates the ECU 12. This enables locking of the fixing member 52.

A part of the bearing 38 is housed in the cylindrical main body 52a in the fixing member 52. Thus, the electric power steering apparatus 1 is miniaturized in the axial direction X1 of the rotatable shaft 37.

The second bearing 47 is composed of a rolling bearing including an inner ring 53, an outer ring 54, and a plurality of rolling elements 55 interposed between the inner ring 53 and the outer ring 54. The inner ring 53 is held in the second end 20b of the worm shaft 20 together rotatably. One end surface of the inner ring 53 abuts on a positioning step provided on the outer periphery of the worm shaft 20. Thus, the axial movement of the inner ring 53 relative to the worm shaft 20 (the movement toward the first bearing 45) is regulated.

There is provided a preload applying mechanism 200 for collectively applying a preload to the first and second bearings 45 and 47 that respectively support the first and second ends 20a and 20b of the worm shaft 20 serving as the driving member. The ECU 12 serving as the control device is arranged between a rotor 64, described below, in the electric motor 18 and the first bearing 45 in the axial direction X1 of the rotatable shaft 37 in the electric motor 18.

The preload applying mechanism 200 includes a first screw section 56, formed in an inlet of the driving gear housing hole 42, adjacent to the bearing holding section 46 in the driving gear housing hole 42 in the driving gear housing 27, and a preload applying member 57 screwed into the first screw section 56 for collectively applying a preload to the first and second bearings 45 and 47. The preload applying member 57 has a disk-shaped main body 58, and a second screw section 59, which is screwed into the first screw section 56, is formed on the outer periphery of the main body 58. An annular projection 60 that presses one end surface of the outer ring 54 in the second bearing 47 is formed on one end surface of the main body 58.

A tool engagement hole 61, having a polygonal shape in cross section, for example, which engages a tool for rotating the preload applying member 57 is formed on the other end surface of the main body 58. The preload applying member 57 is fixed by a lock nut 62, which is screwed into the second screw section 59 in the main body 58.

Both the first and second bearings 45 and 47 that respectively support the first and second ends 20a and 20b of the worm shaft 20 are composed of a known sealed bearing. More specifically, a sealing member 63 that seals an area between an inner ring and an outer ring on both sides in the axial direction X1 of the rolling element 50 is fixed to either one of the inner ring and the outer ring. The sealing member 63 has a lip that makes sliding contact with the other ring.

Since the first and second bearings 45 and 47 that respectively support both ends of the worm shaft 20 are composed of a sealed bearing, a lubricant such as grease within the gear housing 22 does not leak out toward the accommodation chamber 100 that contains the ECU 12. In order to enhance sealing properties within the accommodation chamber 100, a liquid packing may be interposed between the screw section on the other periphery of the main body 52a in the fixing member 52 and a screw section that is screwed thereinto.

In the present embodiment, a brushless motor is used as the electric motor 18. The electric motor 18 includes the motor housing 25, and the rotor 64 and a stator 65 that are housed in the motor housing 25.

The rotor 64 includes an annular rotor core 66 attached to the outer periphery of the rotatable shaft 37 together rotatably, and a rotor magnet 67 composed of an annular permanent magnet, for example, attached to the outer periphery of the rotor core 66 together rotatably. The rotor magnet 67 has a plurality of magnetic poles arranged in its circumferential direction. The N and S poles are alternately switched in the circumferential direction of the rotor 64.

The stator 65 is fixed to the inner periphery of the motor housing main body 26 in the motor housing 25. The stator 65 includes a stator core 68 fixed to the inner periphery of the motor housing main body 26 and a plurality of coils 69. The stator core 68 includes an annular yoke, and a plurality of teeth projecting radially inward from the inner periphery of the yoke. The coils 69 are respectively wound around the corresponding teeth 69.

A bus bar 71 having an annular shape or a C shape is housed within a motor chamber 70 that is defined by the motor housing main body 26 in the motor housing 25 and the first housing 23. The coils 69 respectively wound around the teeth 69 are connected to the bus bar 71. The bus bar 71 is a conductive connection member used for a connection of each of the coils 69 and a current application line. The bus bar 71 functions as a power distribution member for distributing power from a power supply source (not illustrated) among the coils 69.

A rotational position detection device 72 for detecting the rotational position of the rotor 64 is housed within the motor chamber 70 that is defined by the motor housing main body 26 in the motor housing 25 and the first housing 23. The rotational position detection device 72 includes a stator 73 fixed to the first housing 23 and a rotor 74 attached to the rotatable shaft 37 together rotatably. A resolver, for example, can be used as the rotational position detection device 72. A Hall element can also be used.

The rotational position detection device 72 may be arranged between the rotor core 66 in the rotor 64 in the electric motor 18 and the second housing 24 in the axial direction X1 of the rotatable shaft 37 in the electric motor 18. Therefore, the rotational position detection device 72 may be arranged within the motor chamber 70, as in the present embodiment, or may be arranged within a cylindrical section 89, described below, provided at the center of the first housing 23 that partitions the accommodation chamber 100 that contains the ECU 12.

Referring to FIG. 4, the rotatable shaft 37 is rotatably supported by a third bearing and a fourth bearing 76 that are held by the first housing 23 shared by a part of the motor housing 25 and a part of the housing H for housing the ECU 12. The third and fourth bearings 75 and 76 are composed of a sealed bearing having the same configuration as that of the first and second bearings 45 and 47.

The first housing 23 that is a part of the housing H that partitions the accommodation chamber 100 that contains the ECU 12 includes as a bottom wall a partition wall 77 that separates the accommodation chamber 100 and the motor chamber 70. The partition wall 77 is provided with the first interior wall surface 101. A cylindrical projection 104 extends toward the motor housing main body 26 from the vicinity of the outer periphery of the partition wall 77, and one end of the motor housing main body 26 is fitted in the outer periphery of the cylindrical projection 104.

The partition wall 77 has a holding hole 105 for holding an outer ring in the third bearing 75. A cylindrical projection 106 extending toward the motor housing main body 26 from the partition wall 77 is formed coaxially with the holding hole 105. The cylindrical projection 106 has a smaller diameter than that of the cylindrical projection 104 that engages with the motor housing main body 26. The stator 73 in the rotational position detection device 72 is fixed to the inner periphery of the cylindrical projection 106.

The cylindrical section 89 extending toward the second housing 24 from the partition wall 77 is formed coaxially with the holding hole 105. An outer ring in the fourth bearing 76 is held in the inner periphery of the cylindrical section 89. An annular flange 107 extending radially inward is provided to extend at one end of the cylindrical section 89. One end of the outer ring in the fourth bearing 76 abuts on the annular flange 107 so that the axial movement of the outer ring in the fourth bearing 76 relative to the cylindrical section 89 is regulated.

On the other hand, an inner ring in the fourth bearing 76 is sandwiched between an annular positioning step formed on the outer periphery of the rotatable shaft 37 and an end surface of the input member 39 in the joint 38 so that the axial movement of the inner ring in the fourth bearing 76 relative to the rotatable shaft 37 is regulated.

A power substrate 78 and a control substrate 79 that constitute a part of the ECU 12 are housed and held in the accommodation chamber 100. At least a part of a power circuit for driving the electric motor 18 is mounted on the power substrate 78. A switching element such as a field effect transistor (FET) serving as a heat generation element is mounted. The bus bar 71 connected to each of the coils 69 is connected to the power substrate 78 via a bus bar terminal 80 inserted through the partition wall 77 in the first housing 23 and entering the accommodation chamber 100.

The rotational position detection device 72 is connected to the control substrate 79 via a bus bar terminal 81 inserted through the partition wall 77 in the first housing 23 and entering the accommodation chamber 100.

Within the accommodation chamber 100, the power substrate 78 having the power circuit mounted thereon is arranged relatively in close proximity to the first interior wall surface 101 out of the first interior wall surface 101 and the second interior wall surface 102. More specifically, the partition wall 77 includes a thick-walled section 77a having a relatively large thickness t1 and a thin-walled section 77b having a relatively small thickness t1 in the axial direction X1 of the rotatable shaft 37 in the electric motor 18. The thick-walled section 77a projects into the accommodation chamber 100.

The power substrate 78 is arranged in close proximity to the first interior wall surface 101 in the thick-walled section 77a or in contact as in the present embodiment. More specifically, a portion, in the thick-walled section 77a, of the first interior wall surface 101 forms a seat section 103 receiving the power substrate 78.

In the present embodiment, the power substrate 78 is in contact with the first interior wall surface 101 in the thick-walled section 77a so that heat can be conducted, and the thick-walled section 77a functions as a heat sink for releasing heat from the power substrate 78.

The input member 39 in the joint 38 includes a cylindrical section 39a that is fitted in an end of the rotatable shaft 37 in the electric motor 18 together rotatably. The control substrate 79 is arranged around the cylindrical section 39a in the input member 39. More specifically, the cylindrical section 39a is inserted through an insertion hole 79a at the center of the control substrate 79.

The control substrate 79 is arranged between the second interior wall surface 102 in the second housing 24 and the power substrate 78 in the axial direction X1 of the rotatable shaft 37 in the electric motor 18. The power substrate 78 and the control substrate 79 are spaced a predetermined distance apart from each other in the axial direction X1 of the rotatable shaft 37 in the electric motor 18. The electric power steering apparatus 1 is laid out so that respective parts of the control substrate 79 and the joint 38 overlap each other in a direction along the central axis C1 of the rotatable shaft 37 in the electric motor 18.

Within the accommodation chamber 100, a housing space S1 formed between the thin-walled section 77b of the partition wall 77 in the first housing 23 and the control substrate 79 has a sufficient height in the axial direction X1 of the rotatable shaft 37 in the electric motor 18. The housing space S1 houses tall components such as capacitors 85 and a relay 86 as illustrated in FIG. 5, described below, and an inner space of the accommodation chamber 100 is effectively used, which is not illustrated in FIG. 4.

Figure 5:
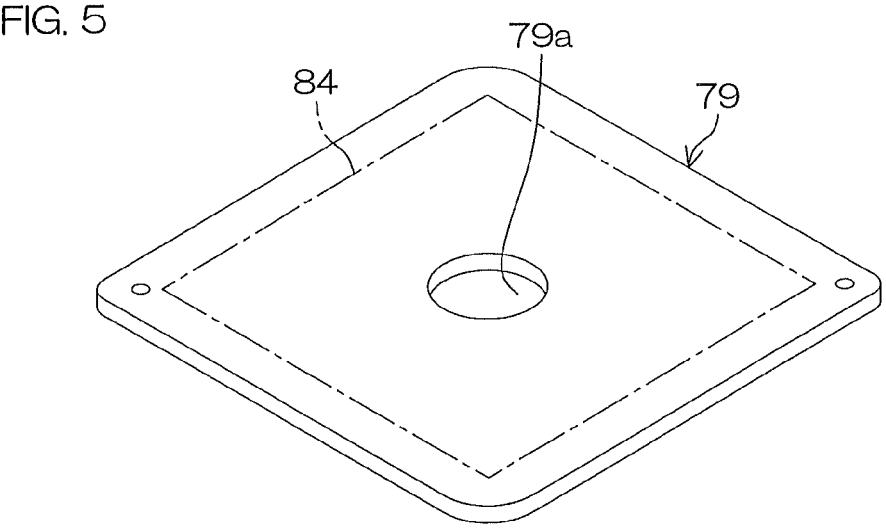
FIG. 5 is an exploded perspective view of a first housing and components in an ECU housed therein.
Figure 5:
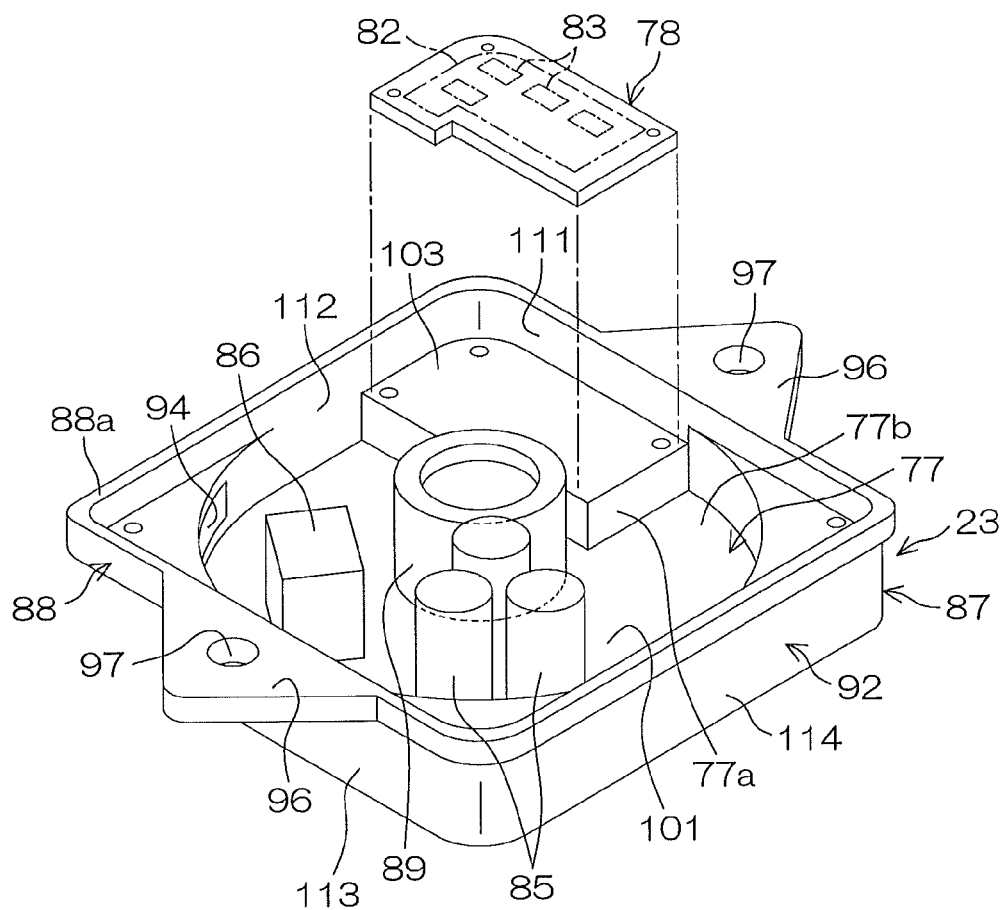
Figure 6:
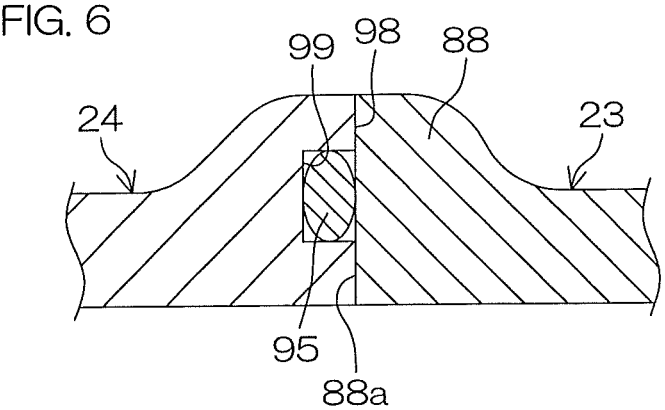
FIG. 6 is an enlarged view of a principal part of FIG. 4.

Then referring to an exploded perspective view of FIG. 5, a power circuit 82 for driving the electric motor 18 is mounted on the power substrate 78. The power circuit 83 mounted on the power substrate 78 includes a plurality of field effect transistors (FETs) 83 serving as heat generation elements. The power substrate 78 is composed of a multilayer substrate having a circuit mounted on its one surface. The multilayer substrate includes a highly heat-conductive plate (not illustrated) composed of an aluminum plate, for example, in surface contact with the thick-walled section 77a serving as a heat sink.

A control circuit 84 for controlling the power circuit 82 for driving the electric motor 18 is mounted on the control substrate 79. The control circuit 84 mounted on the control substrate 79 is arranged around the central axis C1 of the rotatable shaft 37 in the electric motor 18 (or the extension C2 of the central axis C1). The control circuit 84 includes a driver for controlling each of the FETs 83 in the power circuit 82 and a central processing unit (CPU) for controlling the driver. The ECU 12 includes a plurality of capacitors 85 for removing a ripple of a current flowing through the electric motor 18, the relay 86 for cutting off the current flowing through the electric motor 18, as needed, and other non-heat generation elements. The capacitors 85 and the relay 86 constitute a sub-assembly supported by an annular holder made of synthetic resin (not illustrated) as the non-heat generation elements, and can be collectively attached to the first housing 23.

The first housing 23 is a member in a substantially square box shape whose one end opens. More specifically, the first housing 23 includes a main body 87 having a substantially square box shape whose one end opens. The main body 87 includes an outer peripheral wall 92 having a substantially square annular shape, a flange 88 having a square annular shape that protrudes radially outward from one end of the outer peripheral wall 92, and the partition wall 77 serving as the bottom wall.

Within the accommodation chamber 100, a cylindrical section 89 extending toward the opening side of the main body 87 (on the side of the second housing 24) is formed at the center of the partition wall 77. The outer peripheral wall 92 extends from an outer peripheral edge of the partition wall 77, to surround the cylindrical section 89. The main body 87 and the cylindrical section 89 are integrally formed of a single member.

An end surface 88a (an upper surface in FIG. 5) of the flange 88 is formed into a plane. The sealing member 95 comes in contact with the end surface 88a. The flange 88 includes a plurality of (a pair of) bracket-shaped mounting sections 96 projecting radially outward. Each of the mounting sections 96 has a screw insertion hole 97, which penetrates the mounting section 96 in the thickness direction, formed therein. The above-mentioned fixing screw 91 for fastening the first and second housings 23 and 24 is inserted through each of the screw insertion holes 97.

The outer peripheral wall 92 having a square annular shape has four sidewalls 111 to 114, and the pair of mounting sections 96 is provided to extend from ends of the opposite sidewalls 111 and 113. The thick-walled section 77a of the partition wall 77, functioning as a heat sink, connects to an inner surface of the one sidewall 111 from which the mounting section 96 extends.

A portion, in the thick-walled section 77a, of the first interior wall surface 101 forms the seat section 103 receiving the power substrate 78. The seat section 103 is in contact with the power substrate 78 including the FETs 83 serving as the heat generation elements so that heat can be conducted. Heat from the heat generation element is released toward the gear housing 22 integrated with the second housing 24 from the power substrate 78 via the thick-walled section 77a serving as a heat sink and the mounting section 96.

An area of contact with the second housing 24 is made wider in the mounting section 96 used for fastening by the fixing screw 91 than in the other portion of the flange 88. The thick-walled section 77a serving as a heat sink having a large heat capacity connects to the sidewall 111 from which the mounting section 96 extends.

According to the present embodiment, the first housing 23 that is at least a part of the motor housing 25 and the second housing 24 that contacts the first housing 23 constitute the accommodation chamber 100 that accommodates the ECU 12. More specifically, no other housing is interposed between the first housing 23 and the second housing 24. Therefore, miniaturization can be achieved. This results in superior properties for loading in the vehicle.

Moreover, the rotational position detection device 72 for detecting the rotational position of the rotor 64 in the electric motor 18 is arranged between the rotor 64 in the electric motor 18 and the second housing 24 in the axial direction X1 of the rotatable shaft 37 in the electric motor 18. Therefore, the rotational position detection device 72 can be arranged closer to the ECU 12. As a result, the rotational position detection device 72 and the ECU 12 can be easily connected to each other by the bus bar terminal 81 serving as an inner wiring having a small path length. Therefore, the electric power steering apparatus 1 is less easily affected by radio noise than in a conventional case where an outer wiring having a large path length is used. The number of wiring members for the outer wiring can be reduced.

The second interior wall surface 102 in the second housing 24 that partially partitions the accommodation chamber 100 includes an annular plane that is perpendicular to the central axis C1 of the rotatable shaft 37 in the electric motor 18 (or the extension C2 of the central axis C1) and surrounds the central axis C1 (or the extension C2). More specifically, there is no unnecessary protrusion into the accommodation chamber 100 in the axial direction X1 of the rotatable shaft 37 in the electric motor 18. Even if the accommodation chamber 100 is small in size in the axial direction X1, a sufficient inner volume can be ensured as the accommodation chamber 100. Therefore, the electric power steering apparatus 1 can be made as small in size as possible.

The electric power steering apparatus 1 has the following advantages because the second housing 24 is the gear housing 22 that houses the speed reduction mechanism 19 serving as the transmission mechanism for transmitting power from the electric motor 18 to the steering mechanism 4. More specifically, the ECU 12 usually includes the heat generation element such as the switching element (FET 83) mounted on the power substrate 78 as in the present embodiment. On the other hand, the speed reduction mechanism 19 hardly generates heat. Heat from the heat generation element can be effectively released from the interior of the accommodation chamber 100 to the outside via the gear housing 22 that houses the speed reduction mechanism 19.

The electric power steering apparatus 1 can be made smaller in size because respective parts of the control substrate 79 and the joint 38 overlap each other in a direction along the central axis C1 of the rotatable shaft 37 in the electric motor 18.

The extension surface P1 of the annular plane forming the second interior wall surface 102 intersects, as illustrated in FIG. 4, or contacts the cylindrical surface P2 forming a principal portion the outer peripheral surface 28a of the driven gear housing 28 serving as the cylindrical section that surrounds a shaft for transmitting a steering force (corresponding to the steering shaft 6 in the present embodiment). Therefore, the accommodation chamber 100 is arranged sufficiently closer to the steering shaft 6 in the axial direction X1 of the rotatable shaft 37 in the electric motor 18. Therefore, the electric power steering apparatus 1 can be made more smaller in size in the axial direction X1 of the rotatable shaft 37.

The shaft for transmitting the steering force is not limited to the above-mentioned steering shaft 6. It may be the pinion shaft 13 or the rack shaft 14 in the rack-and-pinion mechanism serving as the steering mechanism 4. In the former case, a cylindrical surface forming a principal portion an outer peripheral surface of a cylindrical pinion housing (not illustrated) that surrounds the pinion shaft 13 and the extension surface P1 intersect or contact each other. In the latter case, a cylindrical surface forming a principal portion an outer peripheral surface of a cylindrical rack housing (not illustrated) that surrounds the rack shaft 14 and the extension surface P1 intersect or contact each other.

The ECU 12 serving as the control device is arranged around the central axis C1 of the rotatable shaft 37 in the electric motor 18 or the extension C2 of the central axis C1. Therefore, the inner space of the accommodation chamber 100 can be effectively used to arrange the ECU 12, and thus the electric power steering apparatus 1 can be made smaller in size in the axial direction X1 of the rotatable shaft 37.

The first housing 23 includes the partition wall 77 that separates the accommodation chamber 100 and the motor chamber 70, and the power substrate 78 is provided in relatively close proximity to the first interior wall surface 101 in the partition wall 77. Particularly, the power substrate 78 is in contact with the first interior wall surface 101 in the thick-walled section 77a of the partition wall 77 so that heat can be conducted. Therefore, the thick-walled section 77a of the partition wall 77 in the first housing 23 is used as a heat sink so that heat from the power substrate 78 having the heat generation element such as the FET 83 can be effectively released from the first housing 23 toward the second housing 24 that contacts the first housing 23.

Within the accommodation chamber 100, the housing space S1 opposite to the thin-walled section 77b of the partition wall 77 in the first housing 23 has a sufficient height in the axial direction X1 of the rotatable shaft 37 in the electric motor 18. Therefore, the housing space S1 houses tall components such as the capacitors 85 and the relay 86 illustrated in FIG. 5 so that the inner space of the accommodation chamber 100 is effectively used.

The ECU 12 is arranged between the first bearing 45 that supports the first end 20a of the worm shaft 20, relatively closer to the rotatable shaft 37, and the rotor 64 in the electric motor 18, and the preload applying mechanism 200 is arranged in close proximity to the second end 20b of the worm shaft 20 at a position sufficiently spaced apart from the ECU 12 in the axial direction X1 of the rotatable shaft 37. Even if abrasion powder or the like is produced from the preload applying mechanism 200 in preload adjustment work performed when the electric power steering apparatus 1 is assembled, therefore, the abrasion powder can be inhibited from reaching the vicinity of the ECU 12. As a result, the reliability of the ECU 12 can be improved.

The abrasion powder that may be produced when the second screw section 59 in the preload applying member 57 in the preload applying mechanism 200 is screwed into the first screw section 56 cannot reach the vicinity of the ECU 12.

The accommodation chamber 100 that accommodates the ECU 12 is formed between the first housing 23 that is a part of the motor housing 25 and the second housing 24 that is a part of the gear housing 22, and the preload applying mechanism 200 is arranged outside the accommodation chamber 100. Therefore, abrasion powder that may be produced from the preload applying mechanism 200 does not reach the vicinity of the ECU 12 so that the reliability of the ECU 12 can be significantly improved.

The electric power steering apparatus 1 has the following advantages because the joint 38 serving as a connection member for connecting the rotatable shaft 37 in the electric motor 18 and the worm shaft 20 has the elastic member 41 that contributes to torque transmission, and the elastic member 41 is composed of a nonmetallic insulating member (e.g., insulating rubber or insulating resin). More specifically, even if the elastic member 41 may be damaged so that its fraction enters the vicinity of the ECU 12 after the electric power steering apparatus 1 is shipped, there is no possibility of electric failure. From this viewpoint, the reliability of the ECU 12 is also improved.

The electric power steering apparatus 1 has the following advantages for a positional relationship between the third bearing 76 that rotatably supports the first end 37a on the worm shaft side and the power substrate 78 having the power circuit 82 including the FET 83 or the like mounted thereon. More specifically, at least a part of the power substrate 78 overlaps at least a part of the third bearing 76 in the axial direction X1 of the rotatable shaft 37. Therefore, the power substrate 78 can be sufficiently separated from the preload applying mechanism 200 in the axial direction X1 of the rotatable shaft 37. This prevents the abrasion powder or the like that may be produced from the preload applying mechanism 200 does not reach the vicinity of the power substrate 78. Therefore, the reliability of the ECU 12 can be further improved.

If the power substrate 78 is arranged between the third bearing 76 and the rotor 64 in the axial direction X1 of the rotatable shaft 37, the power substrate 78 can be further separated from the preload applying mechanism 200.

Figure 7:
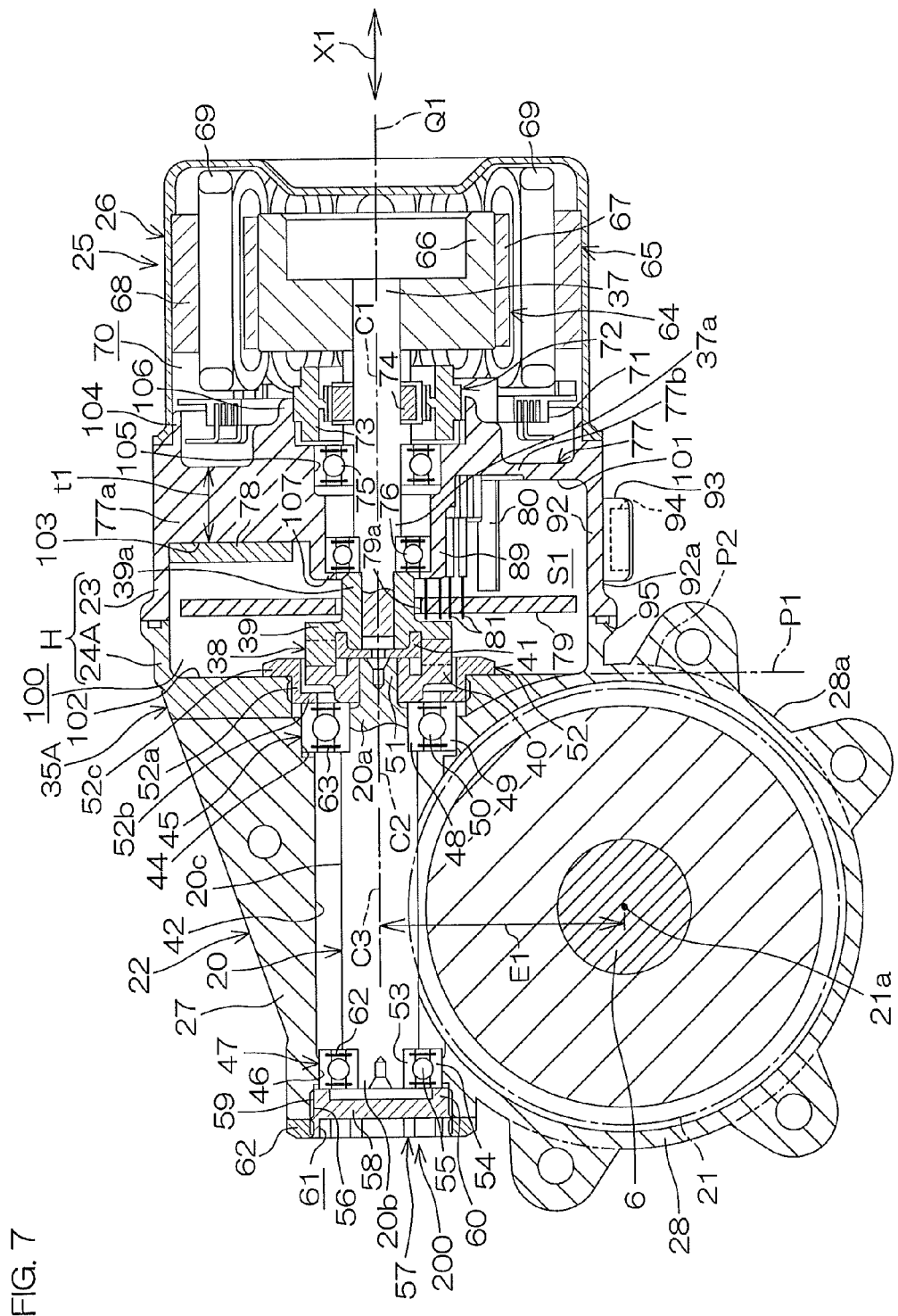
FIG. 7 is an illustrative sectional view of a principal part of an electric power steering apparatus according to another embodiment of the present invention.

Although in the above-mentioned embodiment, the second housing 24 and the gear housing 22 are combined with each other, the present invention is not limited to the same. As illustrated in FIG. 7, the second housing 24A and the sensor housing 35A may be combined with each other. More specifically, the second housing 24A is formed of a single material integrally with the sensor housing 35A. In this case, heat from the heat generation element such as the FET 83 can be effectively released from the interior of the accommodation chamber 100 to the outside via the sensor housing 35A that houses the torque sensor 11 serving as the steered state detection sensor. In FIG. 7, the same constituent elements as those illustrated in FIG. 4 are respectively assigned the same reference numerals.

A housing that houses a steering angle sensor serving as a steered state detection sensor for detecting the steering angle of the steering wheel 2 and the above-mentioned second housing may be combined with each other, which is not illustrated.

Figure 8:
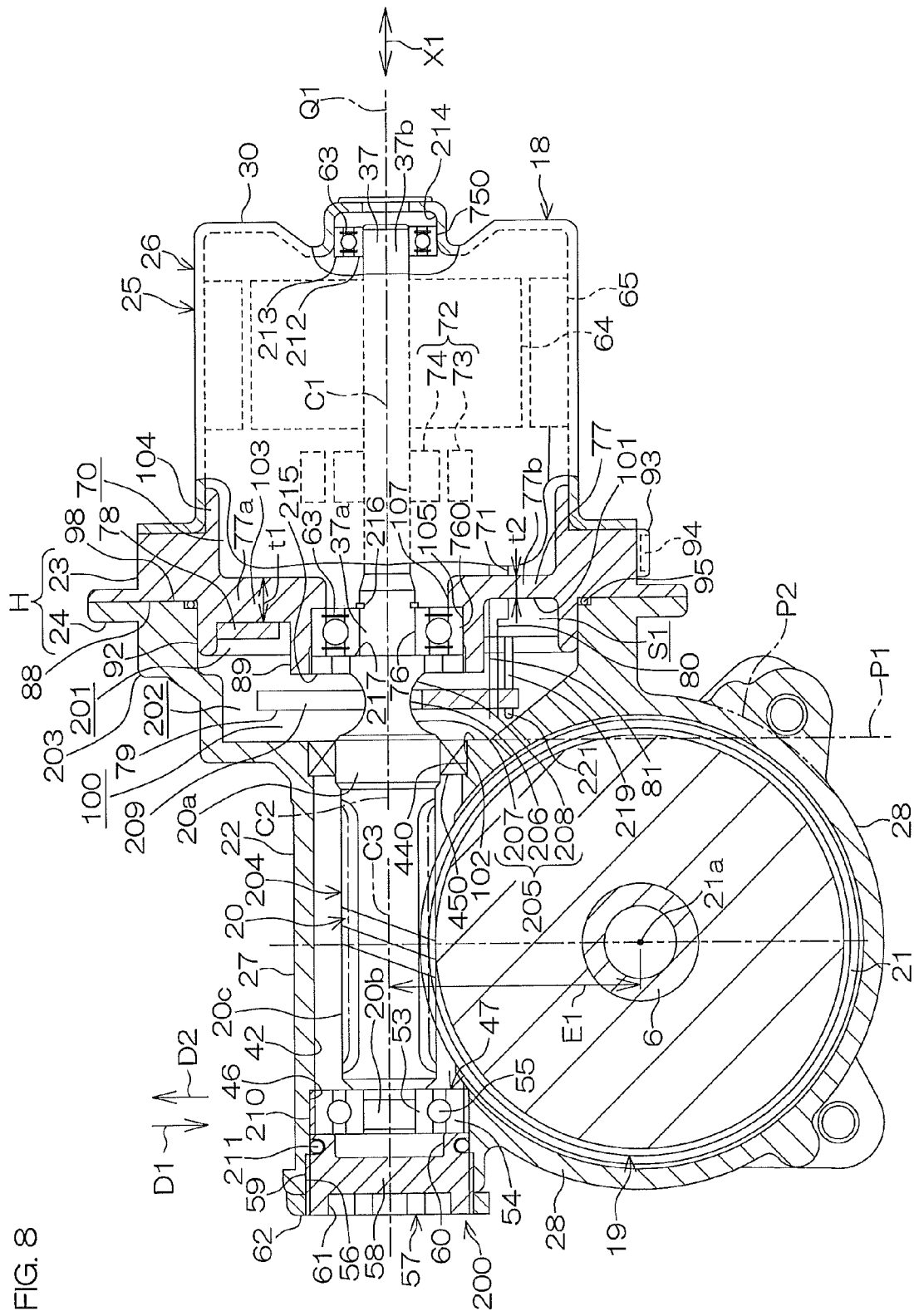
FIG. 8 is an illustrative sectional view of a principal part of the electric power steering apparatus according to another embodiment of the present invention.
Figure 9:
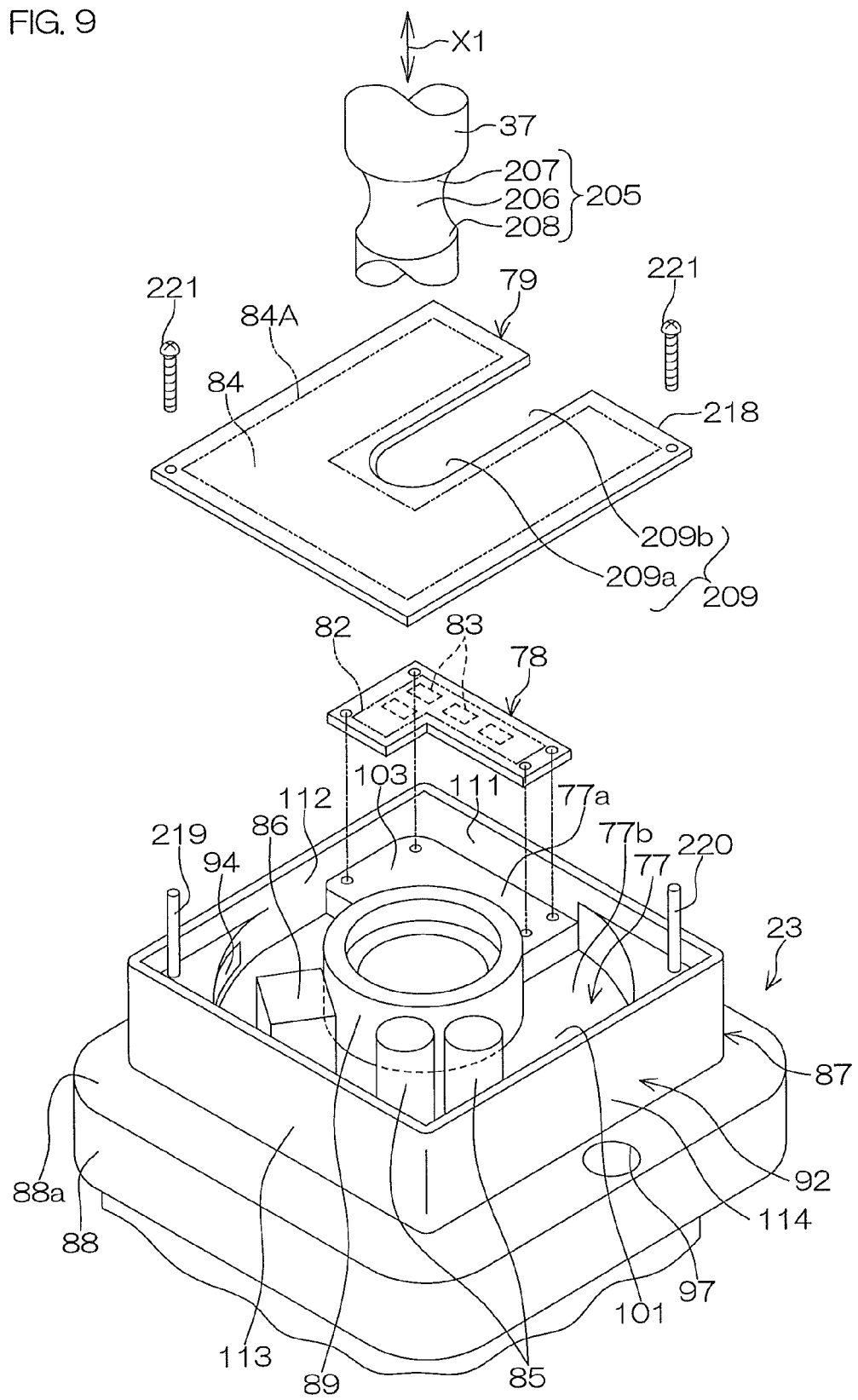
FIG. 9 is an exploded perspective view of a first housing and components in an ECU housed therein in the embodiment illustrated in FIG. 8.
Figure 10:
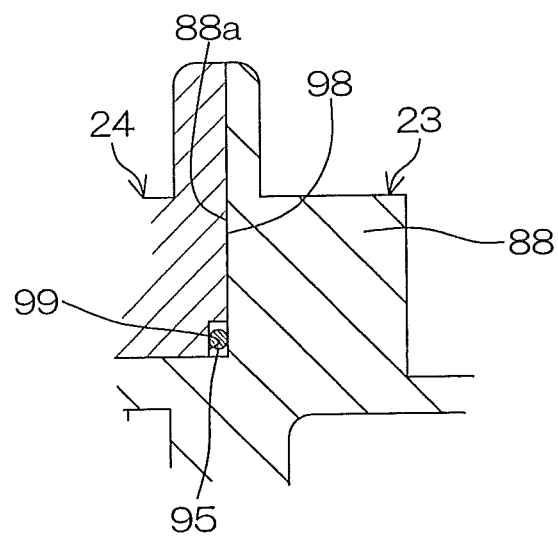
FIG. 10 is an enlarged view of a principal part of FIG. 8.

FIGS. 8, 9, and 10 illustrate another embodiment of the present invention. The present embodiment mainly differs from the embodiment illustrated in FIG. 4 in the following. More specifically, a worm shaft 20 serving as a driving member of a speed reduction mechanism 19 and a rotatable shaft 37 in an electric motor 18 are coaxially arranged, as illustrated in FIG. 8. The worm shaft 20 and the rotatable shaft 37 constitute an integrated shaft 204 integrally formed of a single material. A control substrate 79 including an area 84A having a control circuit 84 mounted thereon, as illustrated in FIG. 9, is arranged around the integrated shaft 204, as illustrated in FIG. 8.

The integrated shaft 204 is supported at three points by a bearing 54 that supports a second end 20b of the worm shaft 20 serving as an element of the integrated shaft 204, a bearing 760 that supports a first end 37a of the rotatable shaft 37 serving as an element of the integrated shaft 204, and a bearing 750 that supports a second end 37b of the rotatable shaft 37.

The first end 20a of the worm shaft 20 is relatively closer to the electric motor 18, and the second end 20b of the worm shaft 20 is relatively farther from the electric motor 18. The first end 37a of the rotatable shaft 37 is relatively closer to the worm shaft 20 serving as a driving member, and the second end 37b of the rotatable shaft 37 is relatively farther from the worm shaft 20 serving as a driving member.

The same constituent elements as those in the embodiment illustrated in FIGS. 4 and 5 are assigned the same reference numerals as those in the embodiment illustrated in FIGS. 4 and 5.

An annular first space 201 is defined by a first interior wall surface 101 and an outer peripheral wall 92 within a first housing 23. Within a second housing 24, a second space 202 is defined by a second interior wall surface 102 and an extension section 203 having a rectangular shape (an annular shape) in cross section extending from the outer periphery of the second interior wall surface 102 and connecting to an end surface 98 of the second housing 24. An accommodation chamber 100 includes the first and second spaces 201 and 202.

An outer peripheral surface of the outer peripheral wall 92 in the first housing 23 is fitted in an inner peripheral surface having a rectangular shape in cross section at a tip end of the extension section 203 in the second housing 24.

The integrated shaft 204 extends from a motor housing main body 26 in a motor housing 25 toward a driving gear housing hole 42. In the worm shaft 20, the respective outer diameters of the second end 20b, a worm 20c, and the first end 20a increase in this order. A connection section 205 for connecting the worm shaft 20 and the rotatable shaft 37 is provided in an intermediate portion of the integrated shaft 204. The connection section 205 has a hourglass shape. The diameter of the connection section 205 gradually decreases toward a central position in an axial direction X1 of the connection section 205.

The connection section 205 includes a thin shaft section 206, and a pair of thick shaft sections 207 and 208 with the thin shaft section 206 sandwiched therebetween on both sides in the axial direction X1 of the rotatable shaft 37. The thin shaft section 206 is inserted through an insertion hole 209 in the control substrate 79, described below, and is arranged at the central position of the connection section 205 in the axial direction X1. More specifically, the thin shaft section 206 includes a smallest-diameter portion of the connection section 205. The pair of thick shaft sections 207 and 208 is arranged adjacent to the thin shaft section 206, and has a larger diameter than that of the thin shaft section 206. The largest diameter of the one thick shaft sections 207 connecting to the first end 20a of the worm shaft 20 is made relatively large, and the largest diameter of the other thick shaft section 208 connecting to the first end 37a of the rotatable shaft 37 is made relatively small.

The first end 37a of the rotatable shaft 37 is adjacent to the other thick shaft section 208 in the connection section 205. The first end 37a includes a cylindrical surface having a smaller diameter than the largest diameter of the other thick shaft section 208. The second end 37b of the rotatable shaft 37 includes a cylindrical surface having a smaller diameter than that of the first end 37a. The diameter of an intermediate portion of the rotatable shaft 37 and the diameter of the second end 37b are substantially equal to each other.

The rotatable shaft 37 serving as a portion of the integrated shaft 204 is housed in the motor housing main body 26 and the first housing 23. The connection section 205 is housed in the first housing 23 and the second housing 24. The worm shaft 20 serving as a portion of the integrated shaft 204 is housed in a gear housing 22.

The worm shaft 20 is housed in the driving gear housing hole 42 in a driving gear housing 27 in the gear housing 22. The worm shaft 20 has the first end 20a and the second end 20b, and the worm 20c is formed in an intermediate portion in the axial direction of the worm shaft 20.

The first end 20a of the worm shaft 20 is surrounded by an annular sealing member 450 held in a sealing member holding hole 440 on the inner periphery at one end of the driving gear housing hole 42 (an end on the side of the electric motor 18).

The sealing member 450 is an integrated molding product formed using an annular elastic member, for example. The outer periphery and the inner periphery of the sealing member 450 are respectively fluid-tightly fitted in the sealing member holding hole 440 and the first end 20a of the worm shaft 20. The sealing member 450 seals an area between the first end 20a of the worm shaft 20 and the sealing member holding hole 440 opposite thereto. Therefore, a lubricant such as grease within the gear housing 22 does not leak out toward the accommodation chamber 100.

The second end 20b of the worm shaft 20 is rotatably supported by a second bearing 47 held in a bearing holding section 46 on the inner periphery at the other end of the driving gear housing hole 42 via an urging member 210.

The bearing holding section 46 supports the second bearing 47 that supports the second end 20b of the worm shaft 20 so as to be displaceable in a direction in which a center-to-center distance E1 between the worm shaft 20 and a worm wheel 21 changes. More specifically, the bearing holding section 46 supports the second bearing 47 so as to be displaceable in a direction D1 in which the center-to-center distance E1 decreases and a distance D2 in which the center-to-center distance E1 increases.

The urging member 210 is housed within the bearing holding section 46, and is arranged on the opposite side of the worm wheel 21 with the second bearing 47 sandwiched therebetween. The urging member 210 elastically urges the second end 20b of the worm shaft 20 toward the corresponding worm wheel 21 in the direction D1 in which the center-to-center distance E1 decreases via the second bearing 47.

The urging member 210 is formed using an elastic member such as a spring or a rubber. The urging member 210 is compressed between the bearing holding section 46 and an outer ring in the second bearing 47, to generate an elastic repulsive force serving as an urging force. The second bearing 47 and the second end 20b of the worm shaft 20b are urged toward the worm wheel 21 by the elastic repulsive force of the urging member 210. As a result, the amount of backlash between meshing portions of a worm 20C and the worm wheel 21 can be reduced. This results in suppression of a rattle sound between the worm 20C and the worm wheel 21.

A sealing member 211 such as an O ring is housed in a peripheral groove formed on an outer peripheral surface of an annular projection 60 of a main body 58 in a preload applying member 57. The sealing member 211 liquid-tightly seals an area between the outer peripheral surface of the annular projection 60 and an inner peripheral surface at the other end of the driving gear housing hole 42 in the gear housing 22 opposite to the outer peripheral surface.

The bearing 760 that supports the first end 37a of the rotatable shaft 37 is held by the first housing 23 in the motor housing 25, and the bearing 750 that supports the second end 37b of the rotatable shaft 37 is held by the motor housing main body 26 in the motor housing 25. Both the bearings 750 and 760 are composed of a known sealed bearing.

More specifically, a sealing member 63 for sealing an area between an inner ring and an outer ring on both sides in the axial direction X1 of a rolling element is fixed to either one of the inner ring and the outer ring. The sealing member 63 has a lip that makes sliding contact with the other ring.

An inner ring 212 in the bearing 750 is fitted in the second end 37b of the rotatable shaft 37 together rotatably. An outer ring 213 in the bearing 750 is held in an annular bearing holding hole 214 formed by concaving the center of a bottom wall 30 in the motor housing main body 26.

By the above-mentioned configuration, the gear housing 22, the housing H, and the motor housing 25 as a housing that houses the integrated shaft 204 support the integrated shaft 204 at three points via the corresponding second bearing 47, bearing 760, and bearing 750.

The other end of an outer ring in the bearing 760 abuts on an annular regulating member 215 such as a nut to be screwed into a screw hole on an inner peripheral surface at a tip end of a cylindrical section 89. Thus, the axial movement of the outer ring in the bearing 760 relative to the cylindrical section 89 is regulated.

On the other hand, an inner ring in the bearing 760 is sandwiched between an annular positioning step 217 formed on the outer periphery of the rotatable shaft 37 and a retaining ring 216 held in an annular groove formed on the outer periphery of the rotatable shaft 37. Thus, the axial movement of an inner ring in a fourth bearing 76 relative to the rotatable shaft 37 is regulated.

An urging force of the preload applying member 57 is transmitted to the worm shaft 20 successively via the outer ring, a rolling element 55, and an inner ring 53 in the second bearing 47. The urging force transmitted to the worm shaft 20 is applied to an annular flange 107 in the cylindrical section 89 successively via the inner ring, a rolling element 55, and the outer ring in the bearing 760 from an annular step 217 in the rotatable shaft 37, and is received by the annular flange 107. Thus, a preload is applied to each of the second bearing 47 and the bearing 760 are pressurized.

Referring to FIG. 8 and an exploded perspective view of FIG. 9, the control substrate 79 has a U-shape (a ⊐ shape) and is arranged around the rotatable shaft 37. The insertion hole 209 through which the thin shaft section 206 of the integrated shaft 204 is to be inserted penetrates the control substrate 79. The insertion hole 209 includes a principal section 209a formed at the center of the control substrate 79 as viewed from the top, and a slit 209b extending from the principal section 209a and opening at one edge 218 of an outer peripheral edge having a rectangular shape, for example, of the control substrate 79.

The thin shaft section 206 of the integrated shaft 204 is inserted through the principal section 209a via the slit 209b from the side of the control substrate 79. As a result, the thin shaft section 206 of the integrated shaft 204 is arranged in the principal section 209a.

The control substrate 79 is arranged between the second interior wall surface 102 in the second housing 24 and a power substrate 78 in the axial direction X1 of the rotatable shaft 37 in the electric motor 18. The power substrate 78 and the control substrate 79 are spaced a predetermined distance apart from each other in the axial direction X1 of the rotatable shaft 37 in the electric motor 18.

Referring to FIGS. 8 and 9, the first housing 23 includes a plurality of (e.g., two) control substrate mounting sections 219 and 220 arranged in the vicinity on the inner side of the outer peripheral wall 92. The control substrate mounting sections 219 and 220 are arranged in the vicinity of corners of the outer peripheral wall 92. The control substrate mounting section 219 is arranged in the vicinity of a boundary between a second sidewall 112 and a third sidewall 113, for example, and the control substrate mounting section 220 is arranged in the vicinity of a boundary between a fourth sidewall 114 and a first sidewall 111.

Each of the control substrate mounting sections 219 and 220 extends in the axial direction X1, and their respective tip ends are arranged within the second space 202. To each of the control substrate mounting sections 219 and 220, the corresponding corner of the control substrate 79 is fixed using a fixing screw 221. Thus, the control substrate 79 is arranged within the second space 202.

According to the present embodiment, the worm shaft 20 serving as a member on the driving side and the rotatable shaft 37 in the electric motor 18 are integrally formed of a single member. Therefore, a coupling for connecting the worm shaft 20 and the rotatable shaft 37 need not separately be provided. As a result, miniaturization and light weight can be achieved. The control circuit can be arranged to overlap the integrated shaft 204 in the axial direction of the integrated shaft 204. As a result, further miniaturization can be achieved.

The gear housing 22, the housing H, and the motor housing 25 support the integrated shaft 204, respectively, via the corresponding second bearing 47, bearing 760, and bearing 750. Thus, the integrated shaft 204 is supported at its three points. Therefore, the number of points at which the integrated shaft 204 is supported can be made smaller than when each of the worm shaft 20 and the rotatable shaft 37 in the electric motor 18 is supported at both its ends. As a result, further miniaturization and improvement in the degree of freedom of a layout within each of the housings 22, H and 25 can be achieved.

Furthermore, between the first end 20a of the worm shaft 20 and the sealing member holding hole 440 in the gear housing 22, the sealing member 450 for sealing an area therebetween is interposed. Thus, the lubricant in the gear housing 22 can be prevented from flowing toward the accommodation chamber 100.

The urging member 210 urges the worm shaft 20 toward the worm wheel 21 so that backlash between the meshing portions of the worm shaft 20 and the worm wheel 21 can be reduced. Therefore, a rattle sound causing driving noise can be prevented from being generated.

Furthermore, the thin shaft section 206 in the connection section 205 in the integrated shaft 204 has a smaller diameter than that of the pair of thick shaft sections 207 and 208. The control substrate 79 may have an insertion hole 209 through which the small-diameter thin shaft section 206 is to be inserted. Therefore, a larger mounting area of the control substrate 79 can be ensured by making the insertion hole 209 in the control substrate 79 as small as possible. Moreover, the size of the control substrate 79 need not be increased outward.

The control substrate 79 has such a U shape that the insertion hole 209 having the slit 209b opening toward the side of the control substrate 79 is formed. Therefore, the control substrate 79 can be inserted through the thin shaft section 206 from its side.

Figure 11:
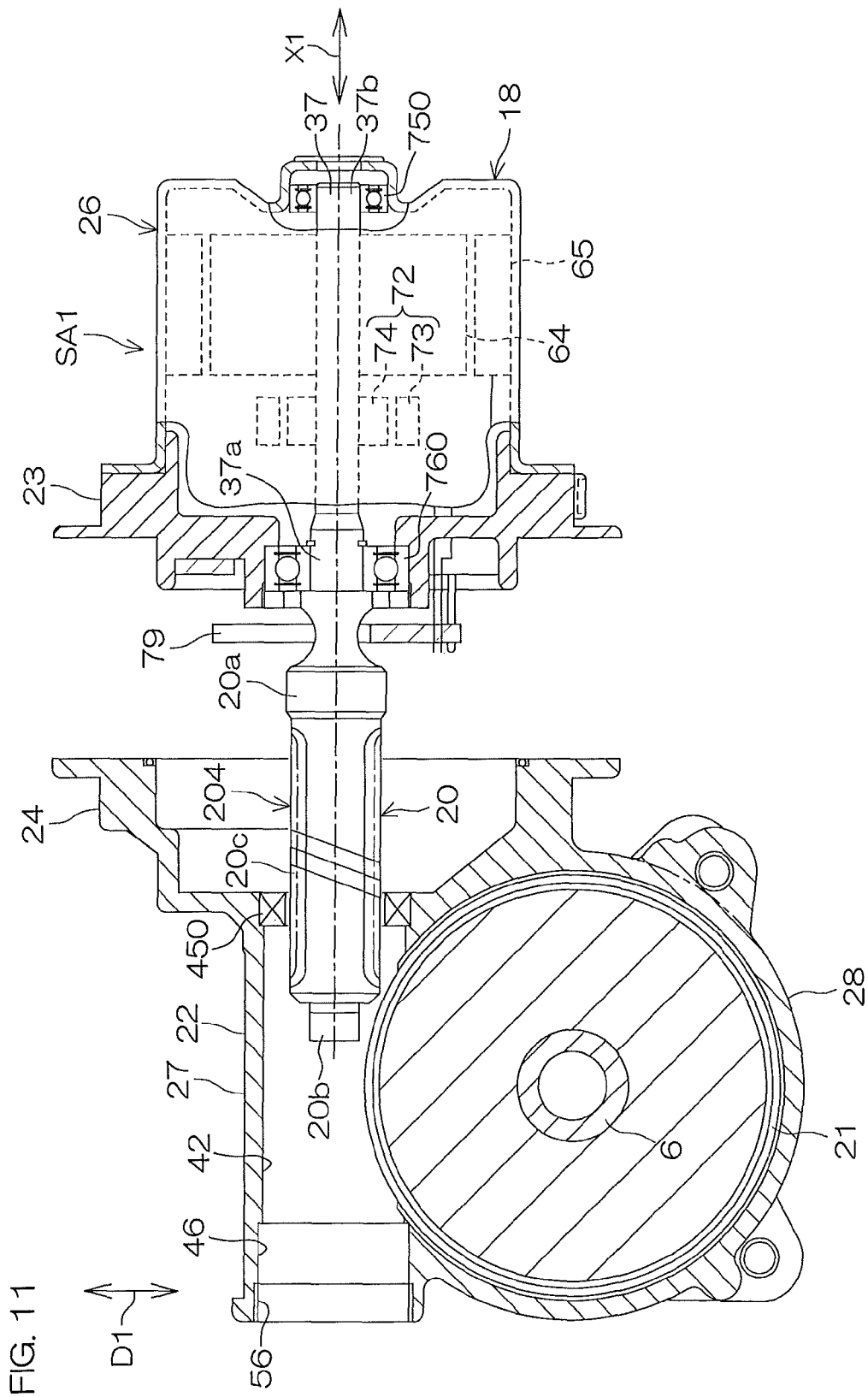
FIG. 11 is an illustrative sectional view of steps for assembling a principal part of the electric power steering apparatus illustrated in FIG. 8.

Furthermore, in the worm shaft 20, the respective outer diameters of the second end 20b, the worm 20c, and the first end 20a increase in this order. This enables the electric power steering apparatus 1 to be manufactured in the following manner. More specifically, a sub-assembly SA1 in which the motor housing main body 26 in the electric motor 18 and the first housing 23 are assembled together, and the rotatable shaft 37 and the control substrate 79 are assembled in the motor housing main body 26 and the first housing 23 is prepared, as illustrated in FIG. 11.

The integrated shaft 204 in the sub-assembly SA1 is then inserted through the driving gear housing hole 42 in the gear housing 22 so that the second housing 24 and the first housing 23 are coupled to each other.

Figure 12:
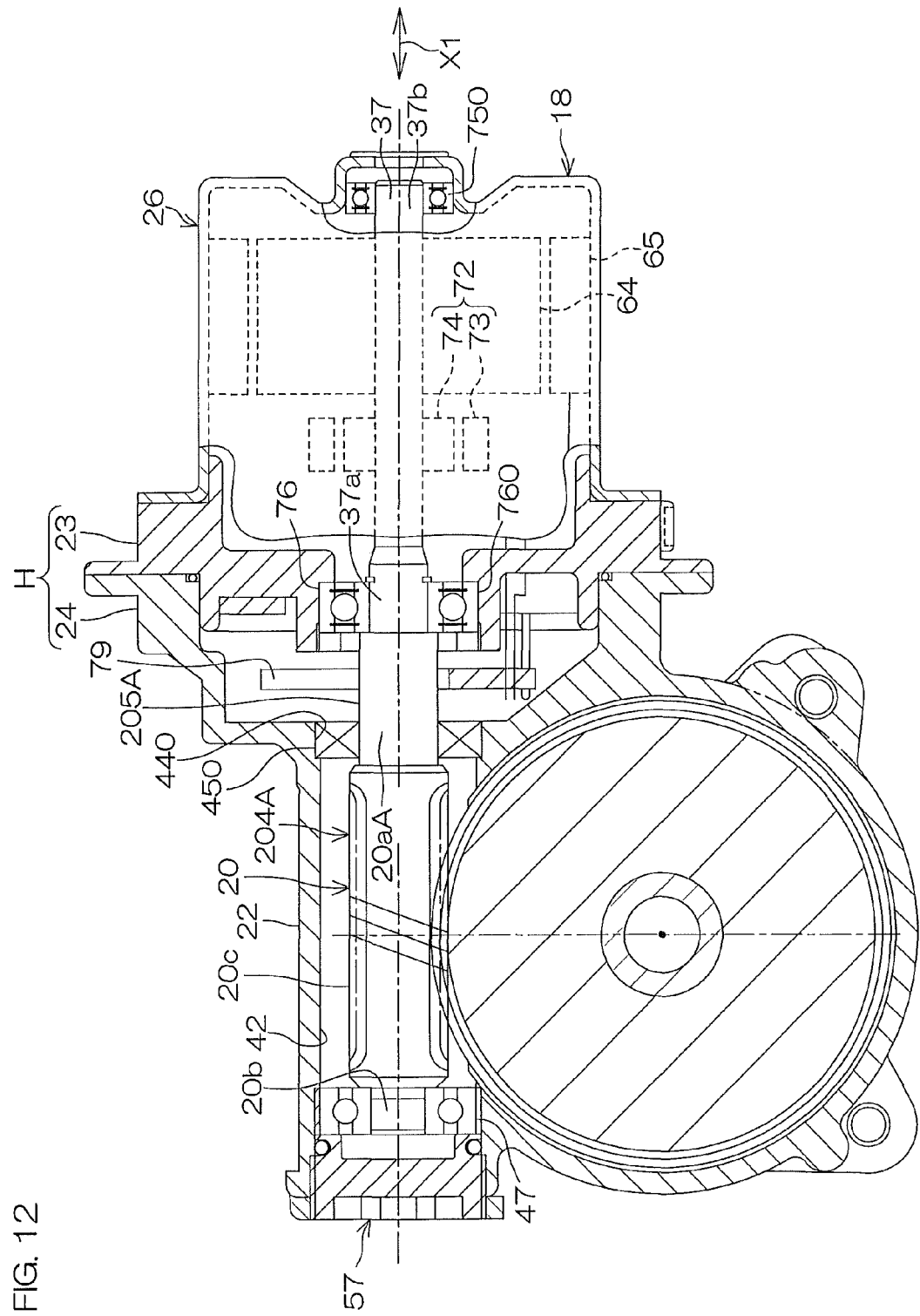
FIG. 12 is an illustrative sectional view of a principal part of an electric power steering apparatus according to still another embodiment of the present invention.

FIG. 12 illustrates still another embodiment of the present invention. As illustrated in FIG. 12, the diameter of an integrated shaft 204A may gradually increase from a rotatable shaft 37 toward an end 20aA of a worm shaft 20 in an axial direction X1. In FIG. 12, the same constituent elements as those illustrated in FIG. 8 are assigned the same reference numerals and hence, the description thereof is not repeated.

More specifically, a connection section 205A is formed into a cylindrical surface having a larger diameter than that of a first end 37a of the rotatable shaft 37. The respective diameters of the first end 20aA of the worm shaft 20 and a connection section 205A are made substantially the same. A worm 20C has a diameter larger than that of the first end 20aA.

Figure 13:
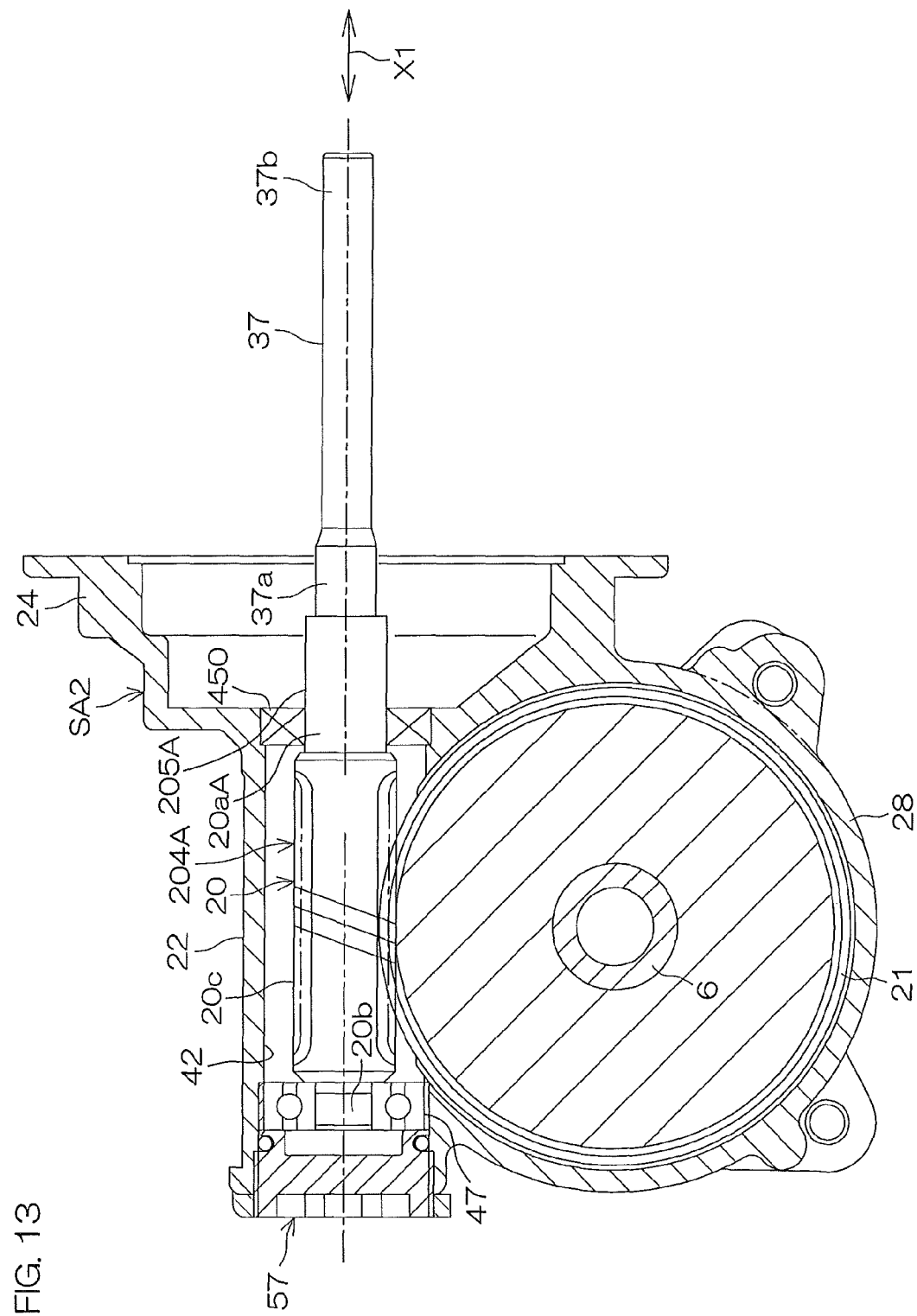
FIG. 13 is a cross-sectional view of a sub-assembly in the electric power steering apparatus illustrated in FIG. 12.

In this case, the electric power steering apparatus can be manufactured in the following manner. More specifically, a sub-assembly SA2 in which the worm shaft 20 is incorporated into a driving gear housing hole 42 in a gear housing 22 while a sealing member 45 is attached to the first end 20aA of the worm shaft 20 and a second bearing 47 and a preload applying member 57 are attached to a second end 20b is first prepared, as illustrated in FIG. 13.

Figure 14:
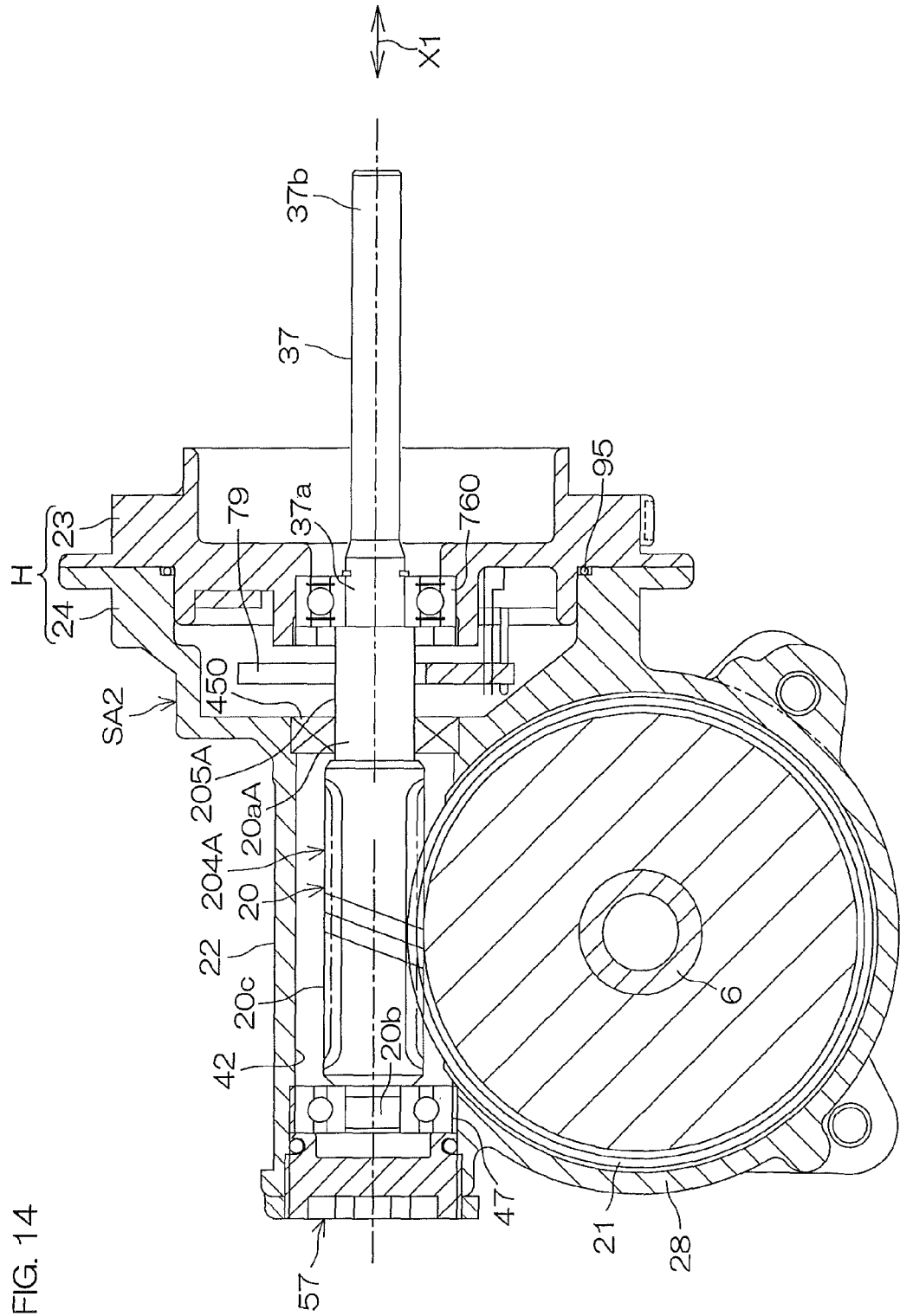
FIG. 14 is an illustrative sectional view of steps for assembling a principal part of the electric power steering apparatus illustrated in FIG. 12.

As illustrated in FIG. 14, a first housing 23 in which a control substrate 79, a fourth bearing 76, and so on are assembled is inserted through an integrated shaft 204A in the sub-assembly SA2, to fix the first housing 23 to the second housing 24. A rotor 74 in a rotational position detection device 72 and a rotor 64 in an electric motor 18 are then fixed to the rotatable shaft 37, and a motor housing main body 26 is then fixed to the first housing 23 (see FIG. 12).

Although in the above-mentioned embodiments illustrated in FIGS. 8 and 12, the bearing 760 may be abandoned and a bearing that is arranged in the vicinity of the sealing member 450 and is held by the gear housing 22 may rotatably support the first end 20a of the worm shaft 20.

Figure 15:
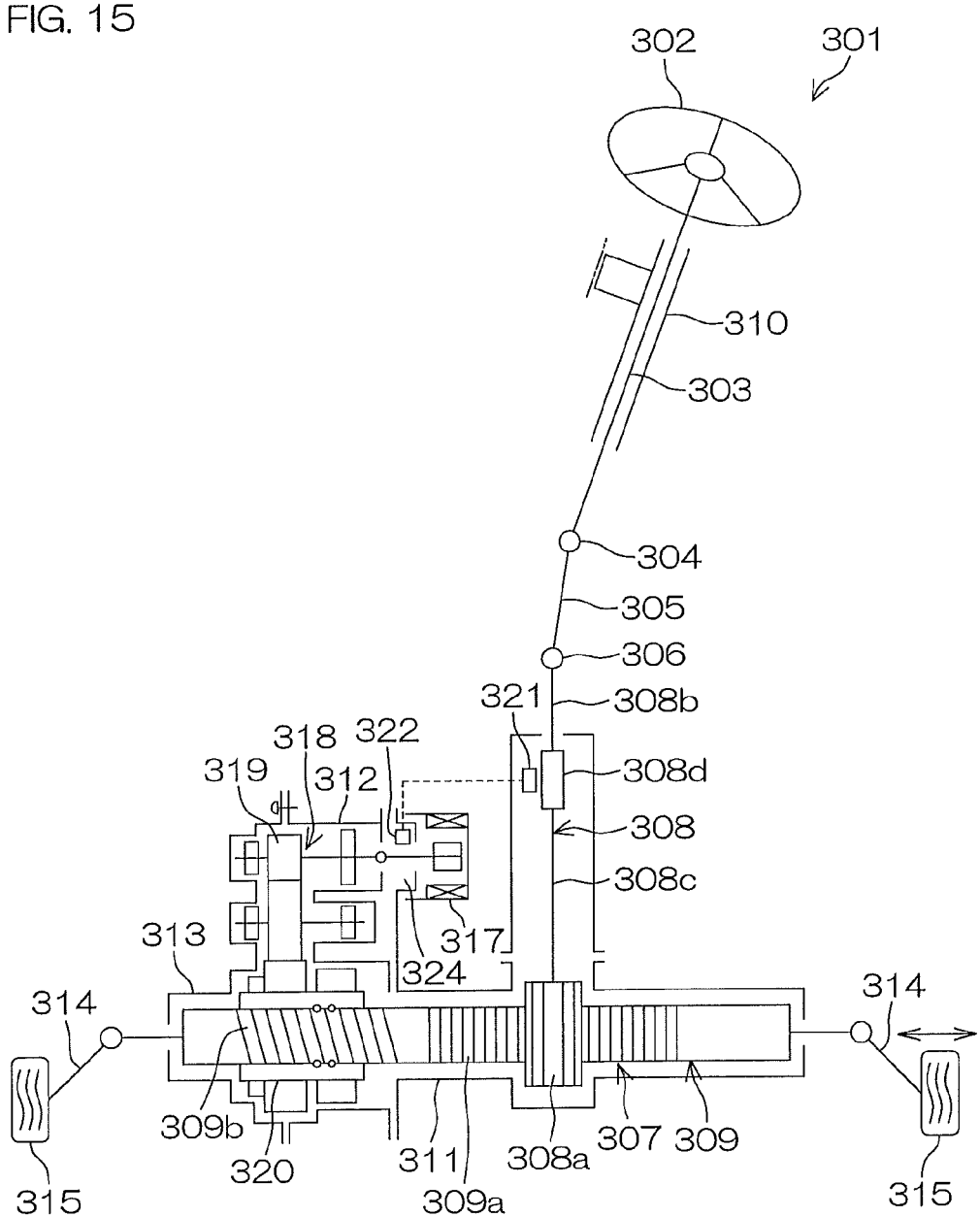
FIG. 15 is a schematic view illustrating the schematic configuration of an electric power steering apparatus serving as a vehicle steering apparatus according to a further embodiment of the present invention.

FIG. 15 is a schematic view illustrating the schematic configuration of an electric power steering apparatus 301 serving as a vehicle steering apparatus according to a further embodiment of the present invention. Referring to FIG. 15, the electric power steering apparatus 301 includes a steering shaft 303 connected to a steering member 302 such as a steering wheel, an intermediate shaft 305 connected to the steering shaft 303 via a universal joint 304, and a steering mechanism 307 composed of a rack-and-pinion mechanism, for example, connected to the intermediate shaft 305 via a universal joint 306.

The steering mechanism 307 includes a pinion shaft 308 connected to the intermediate shaft 305 via the universal joint 306, and a steered shaft 309 extending in a right-and-left direction of a vehicle. The steered shaft 309 includes a rack 309a that meshes with a pinion 308a provided in the pinion shaft 308, and a screw shaft 309b. The steered shaft 309 coaxially includes the rack 309a and the screw shaft 309b integrally formed of a single material.

The steering shaft 303 is rotatably supported via a bearing (not illustrated) by a steering column 310 fixed to a vehicle body.

The steered shaft 309 is supported so as to be linearly movable back and forth via a bearing (not illustrated) by a unit housing 311, a second housing 312, and a third housing 313 that are fixed to the vehicle body.

A pair of ends of the steered shaft 309 projects from the unit housing 311 and the third housing 313, and tie rods 314 are respectively coupled to the ends of the steered shaft 309. Each of the tie rods 314 is connected to a corresponding steerable wheel 315 via a corresponding knuckle arm (not illustrated).

When the steering member 302 is operated so that the steering shaft 303 is rotated, the rotation is converted into the linear motion of the steered shaft 309 in a right-and-left direction of the vehicle by the pinion 308a and the rack 309a. This achieves the steering of the steerable wheels 315.

The pinion shaft 308 includes an input shaft 308b connecting to the intermediate shaft 305 via the universal joint 306, an output shaft 308c connecting to the pinion 308a, and a torsion bar 308d for coaxially connecting the input shaft 308b and the output shaft 308c to each other.

The electric power steering apparatus 301 includes a steering assist mechanism 316 for assisting a driver in steering. The steering assist mechanism 316 includes an electric motor 317, and a transmission mechanism 318 for transmitting power from the electric motor 317 to the steered shaft 309 in the steering mechanism 307.

The transmission mechanism 318 includes a gear mechanism 319 composed of a parallel gear mechanism, for example, for decelerating the output rotation of the electric motor 317, and a motion conversion mechanism 320 composed of a ball screw mechanism, for example, for converting the output rotation of the gear mechanism 319 into the axial movement of the steered shaft 309.

There is provided a torque sensor 321 for detecting a steering torque by an amount of relative rotational displacement between the input shaft 308a and the output shaft 308b via the torsion bar 308d. The result of the torque detection by the torque sensor 321 is input to an electronic control unit (ECU) 322 serving as a control device. The result of vehicle speed detection from a vehicle speed sensor (not illustrated) is input to the ECU 322.

The ECU 322 controls the electric motor 317 based on the result of the torque detection from the torque sensor 321, the result of the vehicle speed detection from the vehicle speed sensor (not illustrated), and so on. More specifically, the ECU 322 carries out control to use a map storing for each vehicle speed a relationship between a torque and a target assist amount to determine the target assist amount and bring an assist force generated by the electric motor 317 closer to the target assist amount.

The transmission mechanism 318 is housed in the second and third housings 312 and 313. The second housing 312 is arranged between the unit housing 311 and the third housing 313 in the axial direction of the steered shaft 309. A part of the unit housing 311 functions as a rack housing that houses the rack 309a in the steered shaft 309.

More specifically, the unit housing 311 includes a rack housing 327 that houses the steered shaft 309, a first motor housing 325 serving as a first housing that is a part of a motor housing 323, and a connection section 328 for connecting the rack housing 327 and the first motor housing 325. The unit housing 311 is integrally formed of a single material.

The present embodiment is mainly characterized in that the first motor housing 325 serving as a first housing that is a part of the motor housing 323 in the electric motor 317 and the rack housing 327 serving as a part of a housing for housing the steering mechanism 307 are integrally formed of a single material, to constitute the unit housing 311. An accommodation chamber 324 that contains the ECU 322 is defined between at least respective parts of the first motor housing 325 serving as the first housing that is at least a part of the motor housing 323 and at least a part of the second housing 312.

Figure 16:
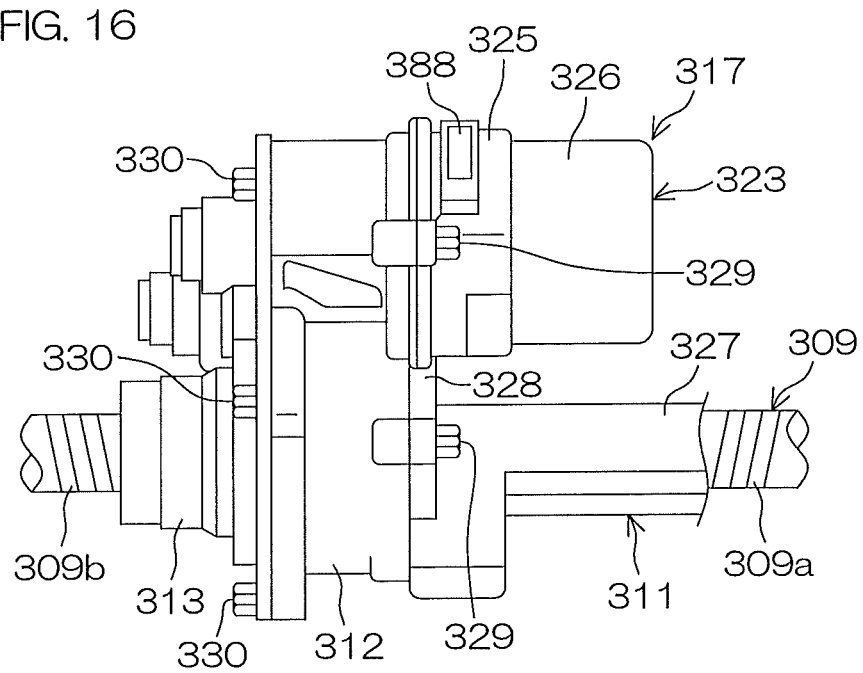
FIG. 16 is a schematic side view of a steering assist mechanism according to the embodiment illustrated in FIG. 15.

Referring to FIG. 16 that is a schematic side view of the electric power steering apparatus 301, the motor housing 323 in the electric motor 317 has the first motor housing 325 and a second motor housing 326 that are combined to contact each other.

Each of the unit housing 311 and the second housing 312 is formed of a material including aluminum, e.g., an aluminum alloy (e.g., a casting, a cold forging), to achieve light weight. The second motor housing 326 in the motor housing 323 uses a non-magnetic sheet metal, for example.

Figure 17:
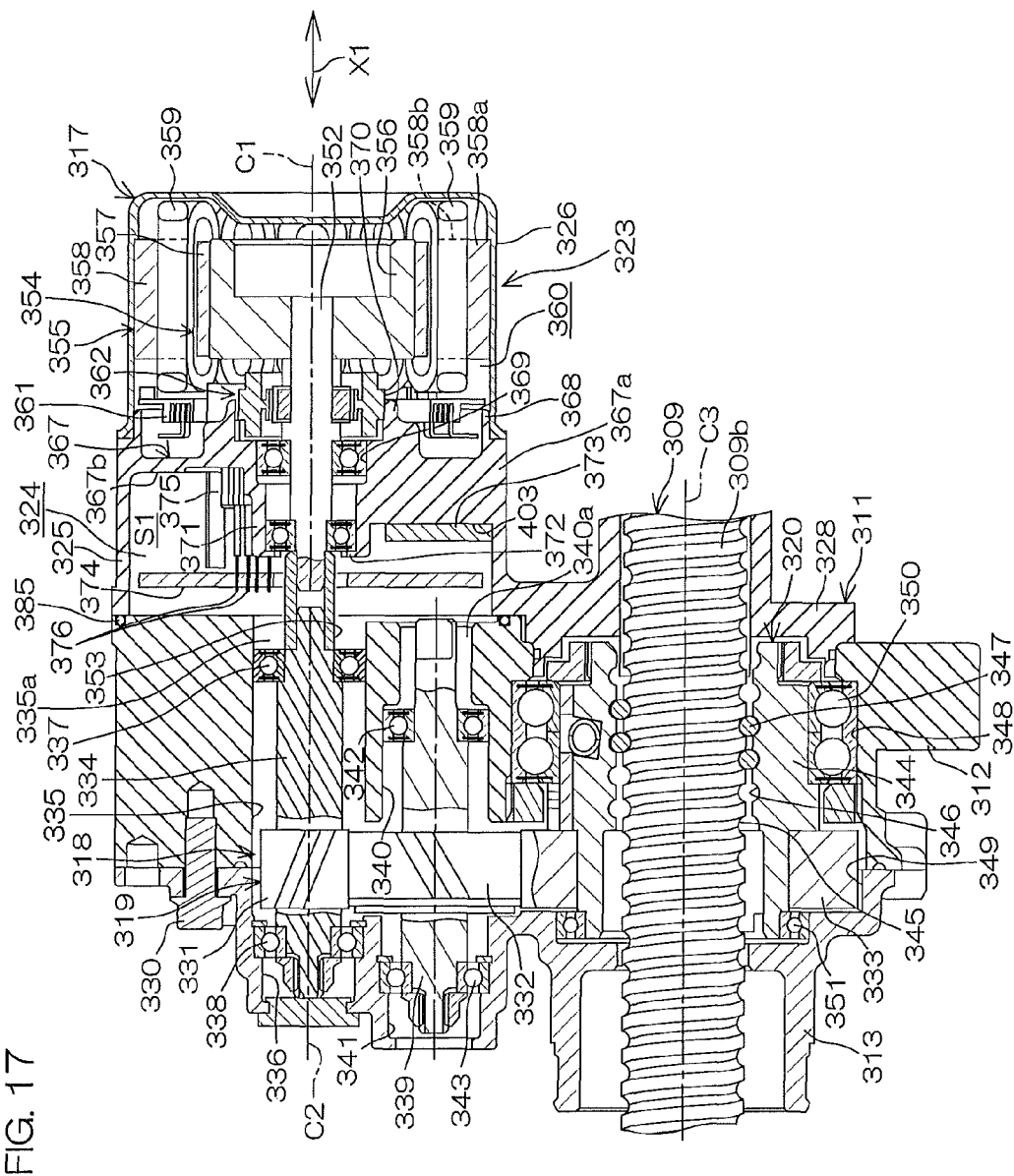
FIG. 17 is a cross-sectional view of the steering assist mechanism according to the embodiment illustrated in FIG. 15.

The unit housing 311 and the second housing 312 abut on (or are fitted in) each other at their respective ends, and are fastened to each other using a fixing screw 329. The second housing 312 and the third housing 313 abut on (or are fitted in) each other at their respective ends, and are fastened to each other using a fixing screw 330. Respective ends of the unit housing 311 and the second housing 312 are sealed by an annular sealing member 385, as illustrated in FIG. 17.

The gear mechanism 319 in the transmission mechanism 318 includes a driving gear 331 that is driven by the electric motor 317, an intermediate gear 332 serving as an idle gear that meshes with the driving gear 331, and a driven gear 333 that meshes with the intermediate gear 332.

The driving gear 331 and its supporting shaft 334 are housed, respectively, within housing holes 335 and 336 formed to communicate with the second and third housings 312 and 313. The supporting shaft 334 in the driving gear 331 has a pair of ends. The ends are rotatably supported, respectively, by the second and third housings 312 and 313 via corresponding bearings 337 and 338.

The intermediate gear 332 and its supporting shaft 339 are mainly housed, respectively, within housing holes 340 and 341 formed to communicate with the second and third housings 312 and 313. The supporting shaft 339 of the intermediate gear 332 has a pair of ends. The ends are rotatably supported, respectively, by the second and third housings 312 and 313 via corresponding bearings 342 and 343. The intermediate gear 332 projects radially outward from the housing holes 340 and 341, and meshes with the driving gear 331 and the driven gear 333.

The bearing 337 and the bearing 342 are composed of a sealed bearing using a shielding plate or an oil seal with a lip. This prevents a lubricant used to lubricate the gears 331 to 333 from entering the accommodation chamber 324, described below, for housing the ECU 322.

The housing holes 335 and 340 in the second housing 312 respectively have openings 335a and 340a communicating with the accommodation chamber 324. The openings 335a and 340a are covered with a motor housing 323 in an electric motor 317.

The motion conversion mechanism 320 in the transmission mechanism 318 includes a screw shaft 309b provided in a part of a steered shaft 309, a rotatable cylinder 344 that is composed of a ball nut that surrounds the screw shaft 309b and is driven by the driven gear 333, and a plurality of balls 347 interposed between corresponding screw grooves 345 and 346 on the outer periphery of the screw shaft 309b and the inner periphery of the rotatable cylinder 344. Since the rotation of the steered shaft 309 including the screw shaft 309b is regulated, the rotation input to the rotatable cylinder 344 is converted into the axial movement of the screw shaft 309b.

The rotatable cylinder 344 is housed in accommodation chambers 348 and 349 respectively communicating with the second and third housings 312 and 313. The rotatable cylinder 344 has a pair of ends. The ends are rotatably supported, respectively, by the second and third housings 312 and 313 via corresponding bearings 350 and 351. The driven gear 333 is attached to the outer periphery of an intermediate portion in the axial direction of the rotatable cylinder 344 together rotatably.

Figure 18:
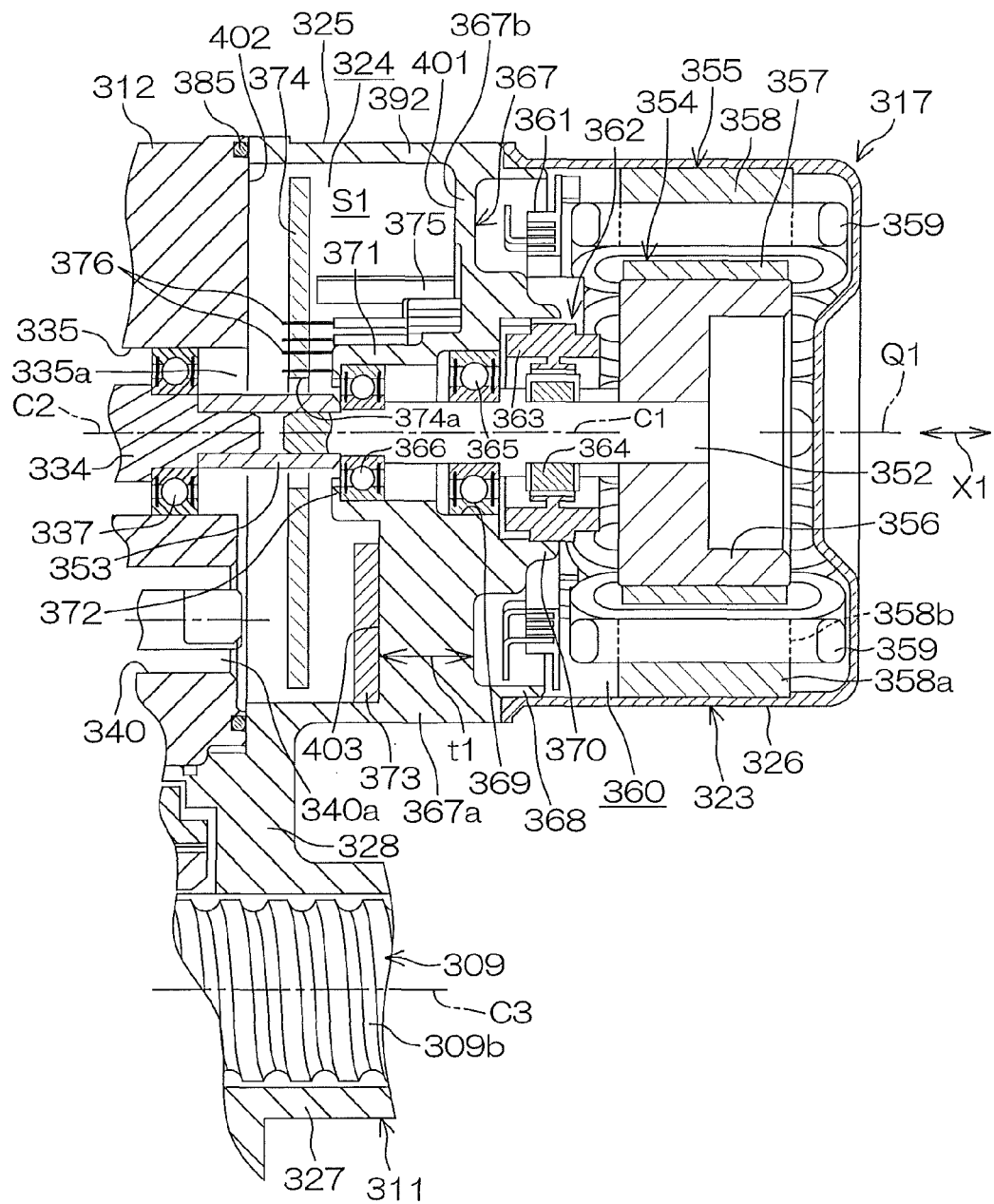
FIG. 18 is an enlarged view of FIG. 17, mainly illustrating a cross section of an electric motor.

Referring to FIG. 18 that is an enlarged view of a principal part of FIG. 17, the first motor housing 325 includes a first wall surface 401 that partially partitions the accommodation chamber 324, the second housing 312 includes a second wall surface 402 that partially partitions the accommodation chamber 324, and the first wall surface 401 and the second wall surface 402 are opposite to each other in an axial direction X1 of a rotatable shaft 352 in the electric motor 317.

The second wall surface 402 in the second housing 312 is composed of an annular plane. The annular plane is perpendicular to a central axis C1 of the rotatable shaft 352 in the electric motor 317 or an extension of the central axis C1 (matched with a central axis C2 of the supporting shaft 334) and surrounds the central axis C1 or the extension. The ECU 322 serving as the control device is arranged around the central axis C1 of the rotatable shaft 352 or the extension C2.

Referring to FIGS. 17 and 18, a blushless motor is used as the electric motor 317. The rotatable shaft 352 in the electric motor 317 and the supporting shaft 334 in the driving gear 331 are coaxially arranged, and the rotatable shaft 352 and the supporting shaft 334 are connected to each other together rotatably via a cylindrical joint 353, for example. The rotatable shaft 352 and the supporting shaft 334 are serration-fitted or spline-fitted in the inner periphery of the joint 353.

Examples of the joint 353 include a joint including an annular input member that rotates together with the rotatable shaft 352 in the electric motor 317, an annular output member that rotates together with the supporting shaft 334, and an annular elastic member that is interposed between the input member and the output member and connects the input member and the output member so that power can be transmitted.

The electric motor 317 includes the above-mentioned motor housing 323, and a rotor 354 and a stator 355 that are housed in the motor housing 323.

The rotor 354 includes an annular rotor core 356 attached to the outer periphery of the rotatable shaft 352 together rotatably, and a rotor magnet 357 composed of an annular permanent magnet, for example, attached to the outer periphery of the rotor core 356 together rotatably. The rotor magnet 357 has a plurality of magnetic poles arranged in its circumferential direction. The N and S poles are alternately switched in the circumferential direction of the rotor 354.

The stator 355 is fixed to the inner periphery of the second motor housing 326. The stator 355 includes a stator core 358 fixed to the inner periphery of the second motor housing 326 and a plurality of coils 359. The stator core 358 includes an annular yoke 358a, and a plurality of teeth 358b projecting radially inward from the inner periphery of the yoke 358a. The coils 359 are respectively wound around the teeth 358b. The yoke 358a may be formed in an integrally angular shape of a single material, or may be configured by combining circumferentially-divided parts in an annular shape.

A bus bar 361 having an annular shape or a C shape is housed within a motor chamber 360 that is defined by the first and second motor housings 325 and 326 in the motor housing 323. The coils 359 respectively wound around the teeth 358b are connected to the bus bar 361. The bus bar 361 is a conductive connection member used for a connection of each of the coils 359 and a current application line. The bus bar 361 functions as a power distribution member for distributing power from a power supply source (not illustrated) among the coils 359.

As illustrated in FIG. 18, a rotational position detection device 362 for detecting the rotational position of the rotor 354 is housed within the motor chamber 360. The rotational position detection device 362 includes a stator 363 fixed to the first motor housing 325 and a rotor 364 attached to the rotatable shaft 352 together rotatably. A resolver, for example, can be used as the rotational position detection device 362. A Hall element can also be used.

The rotational position detection device 362 may be arranged between the rotor core 356 in the rotor 354 in the electric motor 317 and the second housing 312 in the axial direction X1 of the rotatable shaft 352 in the electric motor 317. Therefore, the rotational position detection device 362 may be arranged within the motor chamber 360, as in the present embodiment, or may be arranged within a cylindrical section 371, described below, provided at the center of the first motor housing 325 that partitions the accommodation chamber 324 that accommodates the ECU 322.

The rotatable shaft 352 is rotatably supported by bearings 365 and 366 that are held by the first motor housing 325. The bearings 365 and 366 are composed of a sealed bearing.

The first motor housing 325 that partitions the accommodation chamber 324 that contains the ECU 322 includes as a bottom wall a partition wall 367 that separates the accommodation chamber 324 and the motor chamber 360. The partition wall 367 is provided with the first wall surface 401. A cylindrical projection 368 extends toward the second motor housing 326 from the vicinity of the outer periphery of the partition wall 367, and one end of the second motor housing 326 is fitted in the outer periphery of the cylindrical projection 368.

The partition wall 367 has a holding hole 369 for holding an outer ring in the bearing 365. A cylindrical projection 370 extending toward the second motor housing 326 from the partition wall 367 is formed coaxially with the holding hole 369. The cylindrical projection 370 has a smaller diameter than that of the cylindrical projection 368 that engages with the second motor housing 326. The stator 363 in the rotational position detection device 362 is fixed to the inner periphery of the cylindrical projection 370.

The cylindrical section 371 extending toward the second housing 312 from the partition wall 367 is formed coaxially with the holding hole 369. An outer ring in the bearing 366 is held in the inner periphery of the cylindrical section 371. An annular flange 372 extending radially inward is provided to extend at one end of the cylindrical section 371. One end of the outer ring in the bearing 366 abuts on the annular flange 372 so that the axial movement of the outer ring in the bearing 366 relative to the cylindrical section 371 is regulated.

On the other hand, an inner ring in the bearing 366 is sandwiched between an annular positioning step formed on the outer periphery of the rotatable shaft 352 and an end surface of the joint 353 so that the axial movement of an inner ring in the bearing 366 relative to the rotatable shaft 352 is regulated.

A power substrate 373 and a control substrate 374 that constitute a part of the ECU 322 are housed and held in the accommodation chamber 324. At least a part of a power circuit for driving the electric motor 317 (e.g., a switching element such as an FET) is mounted on the power substrate 373. The bus bar 361 connected to each of the coils 359 is connected to the power substrate 373 via a bus bar terminal 375 inserted through the partition wall 367 in the first motor housing 325 and entering the accommodation chamber 324.

The rotational position detection device 362 is connected to the control substrate 374 via a bus bar terminal 376 inserted through the partition wall 367 in the first motor housing 325 and entering the accommodation chamber 324.

Within the accommodation chamber 324, the power substrate 373 having the power circuit mounted thereon is arranged in relatively close proximity to the first wall surface 401 out of the wall surface 401 and the second wall surface 402. More specifically, the partition wall 367 includes a thick-walled section 367a having a relatively large thickness t1 and a thin-walled section 367b having a relatively small thickness t1 in the axial direction X1 of the rotatable shaft 352 in the electric motor 317. The thick-walled section 367a projects into the accommodation chamber 324.

The power substrate 373 is arranged in close proximity to the first wall surface 401 in the thick-walled section 367a or in contact as in the present embodiment. More specifically, a portion, in the thick-walled section 367a, of the first wall surface 401 forms a seat section 403 receiving the power substrate 373.

In the present embodiment, the power substrate 373 is in contact with the first wall surface 401 in the thick-walled section 367a so that heat can be conducted, and the thick-walled section 367a functions as a heat sink for releasing heat from the power substrate 373.

The control substrate 374 is arranged around the cylindrical joint 353. More specifically, the joint 353 is inserted through an insertion hole 374a at the center of the control substrate 374.

The control substrate 374 is arranged between the second wall surface 402 in the second housing 312 and the power substrate 373 in the axial direction X1 of the rotatable shaft 352 in the electric motor 317. The power substrate 373 and the control substrate 374 are spaced a predetermined distance apart from each other in the axial direction X1 of the rotatable shaft 352 in the electric motor 317. The electric power steering apparatus 301 is laid out so that respective parts of the control substrate 374 and the joint 353 overlap each other in a direction along the central axis C1 of the rotatable shaft 352 in the electric motor 317.

Within the accommodation chamber 324, a housing space S1 formed between the thin-walled section 367b of the partition wall 367 in the first motor housing 325 and the control substrate 374 has a sufficient height in the axial direction X1 of the rotatable shaft 37 in the electric motor 317. The housing space S1 houses tall components such as capacitors 377 and a relay 378 as illustrated in FIG. 19, described below, and an inner space of the accommodation chamber 324 is effectively used, which is not illustrated in FIG. 18.

Figure 19:
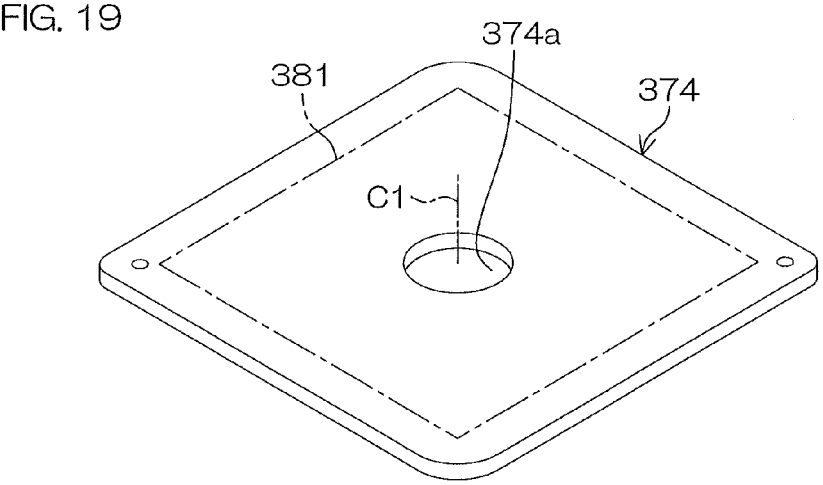
FIG. 19 is an exploded perspective view of a first motor housing and components in an ECU housed therein in the embodiment illustrated in FIG. 15.
Figure 19:
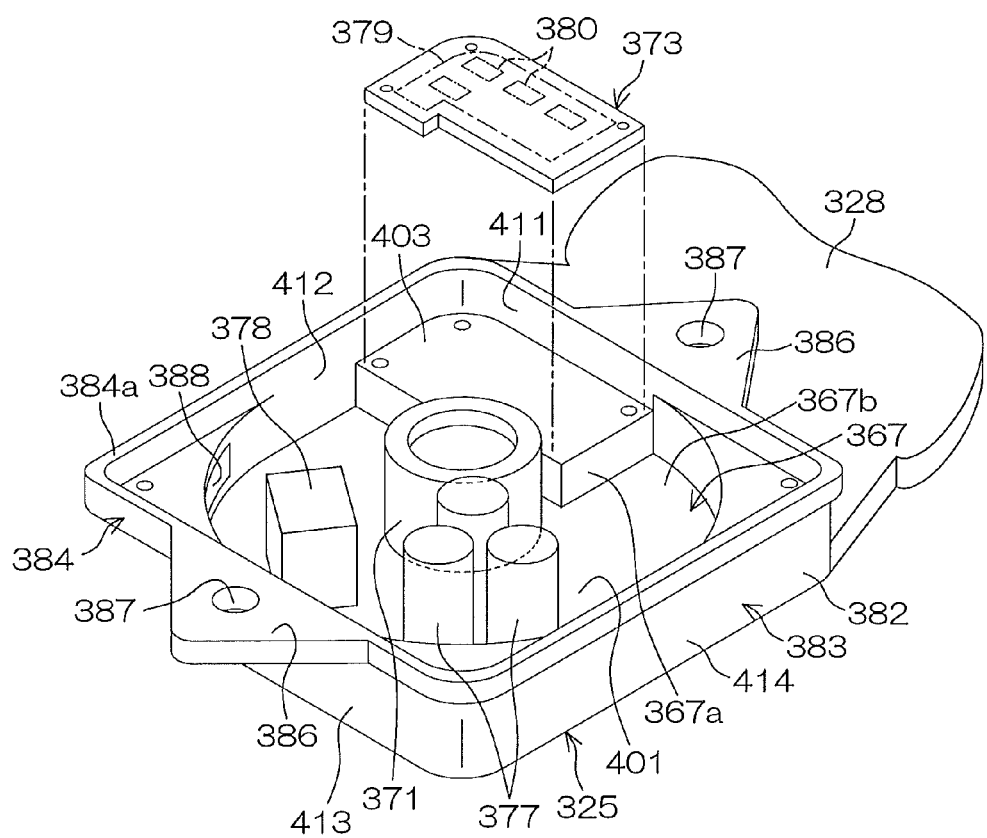

Then referring to an exploded perspective view of FIG. 19, a power circuit 379 for driving the electric motor 317 is mounted on the power substrate 373. The power circuit 379 mounted on the power substrate 373 includes a plurality of FETs 380 serving as heat generation elements. The power substrate 373 is composed of a multilayer substrate having a circuit mounted on its one surface. The multilayer substrate includes a highly heat-conductive plate (not illustrated) composed of an aluminum plate, for example, in surface contact with the thick-walled section 367a serving as a heat sink.

A control circuit 381 for controlling the power circuit 379 for driving the electric motor 317 is mounted on the control substrate 374. The control circuit 381 mounted on the control substrate 374 is arranged around the central axis C1 of the rotatable shaft 352 in the electric motor 317 (or the extension C2 of the central axis C1). The control circuit 381 includes a driver for controlling each of the FETs 380 in the power circuit 379 and a central processing unit (CPU) for controlling the driver.

The ECU 322 includes a plurality of capacitors 377 for removing a ripple of a current flowing through the electric motor 317, a relay 378 for cutting off the current flowing through the electric motor 317, as needed, and other non-heat generation elements. The capacitors 377 and the relay 378 constitute a sub-assembly supported by an annular holder made of synthetic resin (not illustrated) as the non-heat generation elements, and can be collectively attached to the first motor housing 325.

The first motor housing 325 formed of a single material integrally with the rack housing 327 via the connection section 328 is a member in a substantially square box shape whose one end opens. More specifically, the first motor housing 325 includes a main body 382 having a substantially square box shape whose one end opens. The main body 382 includes an outer peripheral wall 383 having a substantially square annular shape, a flange 384 having a square annular shape that protrudes radially outward from one end of the outer peripheral wall 383, and the partition wall 367 serving as a bottom wall.

Within the accommodation chamber 324, a cylindrical section 371 extending toward the opening side of the main body 382 (on the side of the second housing 312) is formed at the center of the partition wall 367. The outer peripheral wall 383 extends from an outer peripheral edge of the partition wall 367, to surround the cylindrical section 371. The main body 382 and the cylindrical section 371 are integrally formed of a single member.

An end surface 384a (an upper surface in FIG. 19) of the flange 384 is formed into a plane. The sealing member 385 comes in contact with the end surface 384a. The flange 384 includes a plurality of (a pair of) bracket-shaped mounting sections 386 projecting radially outward. Each of the mounting sections 386 has a screw insertion hole 387, which penetrates the mounting section 386 in the thickness direction, formed therein. The above-mentioned fixing screw 329 for fastening the first motor housing 325 and the second housing 312 is inserted through each of screw insertion holes 387.

The outer peripheral wall 383 having a square annular shape has four sidewalls 411 to 414, and the pair of mounting section 386 is provided to extend at ends of the opposite sidewalls 411 and 413. The thick-walled section 367a of the partition wall 367, functioning as a heat sink, connects to an inner surface of the one sidewall 411 from which the mounting section 386 extends.

A portion, in the thick-walled section 367a, of the first wall 401 forms the seat section 403 receiving the power substrate 373. The seat section 403 is in contact with the power substrate 373 including the FETs 380 serving as the heat generation elements so that heat can be conducted. Heat generated by the heat generation element is released toward the rack housing 327 integrated with the second housing 312 from the power substrate 373 via the thick-walled section 367a serving as a heat sink and the mounting section 386.

An area of contact with the second housing 312 is wider in the mounting section 386 used for fastening by the fixing screw 329 than in the other portion of the flange 384. The thick-walled section 367a serving as a heat sink having a large heat capacity connects to the sidewall 411 from which the mounting section 386 extends.

An electric connector 388 provided with a terminal for supplying power to the ECU 322 from a battery and a terminal for input and output of a signal from the exterior is held in a holding section formed on the outer peripheral wall 383.

According to the present embodiment, the rack housing 327 that is a part of the housing for housing the steering mechanism 307 and the first motor housing 325 that is a part of the motor housing 323 are integrally formed of a single material. Therefore, the number of components can be reduced. As a result, the configuration of the electric power steering apparatus 301 can be simplified. At least a part of the motor housing 323 can be substantially used for the accommodation chamber 324 that contains the ECU 322.

The unit housing 311 including the first motor housing 325 and the rack housing 327 is integrally formed of a single material. Therefore, the whole rigidity of the unit housing 311 can be significantly improved so that vibration can be reduced.

The degree of parallelization between the rotatable shaft 352 supported by the motor housing 323 and the steered shaft 309 supported by the rack housing 327 can be improved. From this viewpoint, vibration can also be reduced. Thermal conductivity between both the housings 325 and 327 can be improved more significantly than when both the housings are respectively composed of separate members. When both the housings 325 and 327 are used to release heat generated by the heat generation element (e.g., the FET 380), therefore, the heat can be satisfactory released.

The first motor housing 325 is connected to the second housing 312 that houses the transmission mechanism 318 to cover openings 335a and 340a of the second housing 312. Therefore, the number of components can be made smaller than when a cover is separately provided. The transmission mechanism 318 hardly generates heat. Therefore, heat from the heat generation element (e.g., the FET 380) can be effectively released via the second housing 312 that houses the transmission mechanism 318.

The first motor housing 325 that is a part of the motor housing 323 and a part of the second housing 312 that contacts the first motor housing 325 constitute the accommodation chamber 324 that contains the ECU 322. More specifically, no other housing is interposed between the first motor housing 325 and the second housing 312. Therefore, miniaturization can be achieved. This results in superior properties for loading in the vehicle.

Moreover, the rotational position detection device 362 for detecting the rotational position of the rotor 354 in the electric motor 317 is arranged between the rotor 354 in the electric motor 317 and the second housing 312 in the axial direction X1 of the rotatable shaft 352 in the electric motor 317. Therefore, the rotational position detection device 362 can be arranged closer to the ECU 322. As a result, the rotational position detection device 362 and the ECU 322 can be easily connected to each other by the bus bar terminal 376 serving as an inner wiring having a small path length. Therefore, the electric power steering apparatus 301 is less easily affected by radio noise than in a conventional case where an outer wiring having a large path length is used. The number of wiring members for the outer wiring can be reduced.

The second wall surface 402 in the second housing 312 that partially partitions the accommodation chamber 324 includes an annular plane that is perpendicular to the central axis C1 of the rotatable shaft 352 in the electric motor 317 (or its extension) and surrounds the central axis C1 (or the extension). More specifically, there is no unnecessary protrusion into the accommodation chamber 324 in the axial direction X1 of the rotatable shaft 352 in the electric motor 317. Even if the accommodation chamber 324 is small in size in the axial direction X1, a sufficient inner volume can be ensured as the accommodation chamber 324. Therefore, the electric power steering apparatus 301 can be made as small in size as possible.

The electric power steering apparatus 301 has the following advantages because the second housing 312 houses the transmission mechanism 318 for transmitting power from the electric motor 317 to the steering mechanism 307. More specifically, the ECU 322 usually includes the heat generation element such as the switching element (FET 380) mounted on the power substrate 373 as in the present embodiment. On the other hand, the transmission mechanism 318 hardly generates heat. A mechanism within the rack housing 327 formed of a single material integrally with the first motor housing 325 also hardly generates heat. Therefore, heat can be effectively released from the interior of the accommodation chamber 324 to the outside.

The electric power steering apparatus 301 can be made smaller in size because the respective parts of the control substrate 374 and the joint 353 overlap each other in a direction along the central axis C1 of the rotatable shaft 352 in the electric motor 317.

The ECU 322 serving as the control device is arranged around the central axis C1 of the rotatable shaft 352 in the electric motor 317 (or the extension of the central axis C1). Therefore, an inner space of the accommodation chamber 324 can be effectively used to arrange the ECU 322, and thus the electric power steering apparatus 301 can be made smaller in size in the axial direction X1 of the rotatable shaft 352.

The first motor housing 325 includes the partition wall 367 that separates the accommodation chamber 324 and the motor chamber 360, and the power substrate 373 is provided in relatively close proximity to the first wall surface 401 in the partition wall 367. Particularly, the power substrate 373 is in contact with the first wall surface 401 in the thick-walled section 367a of the partition wall 367 so that heat can be conducted. Therefore, the thick-walled section 367a of the partition wall 367 in the first motor housing 325 is used as a heat sink so that heat from the power substrate 373 having the heat generation element such as the FET 380 can be effectively released from the first motor housing 325 toward the second housing 24 that contacts the first motor housing 325.

The thick-walled section 367a serving as a heat sink is arranged in close proximity to the connection section 328. Therefore, heat from the power substrate 373 having the heat generation element such as the FET 380 can be effectively released to the rack housing 327 via the connection section 328. More specifically, the thick-walled section 367a is arranged between the central axis C1 of the rotatable shaft 352 and the steered shaft 309, as viewed from a direction perpendicular to a plane (corresponding to paper) including the central axis C1 of the rotatable shaft 352 and a central axis C3 of the steered shaft 309 in the electric motor 317 (corresponding to a direction perpendicular to paper), as illustrated in FIG. 18.

Within the accommodation chamber 324, the housing space S1 opposite to the thin-walled section 367b of the partition wall 367 in the first motor housing 325 has a sufficient height in the axial direction X1 of the rotatable shaft 352 in the electric motor 317. Therefore, the housing space S1 houses tall components such as the capacitors 377 and the relay 378 illustrated in FIG. 19 so that the inner space of the accommodation chamber 324 is effectively used.

Figure 20:
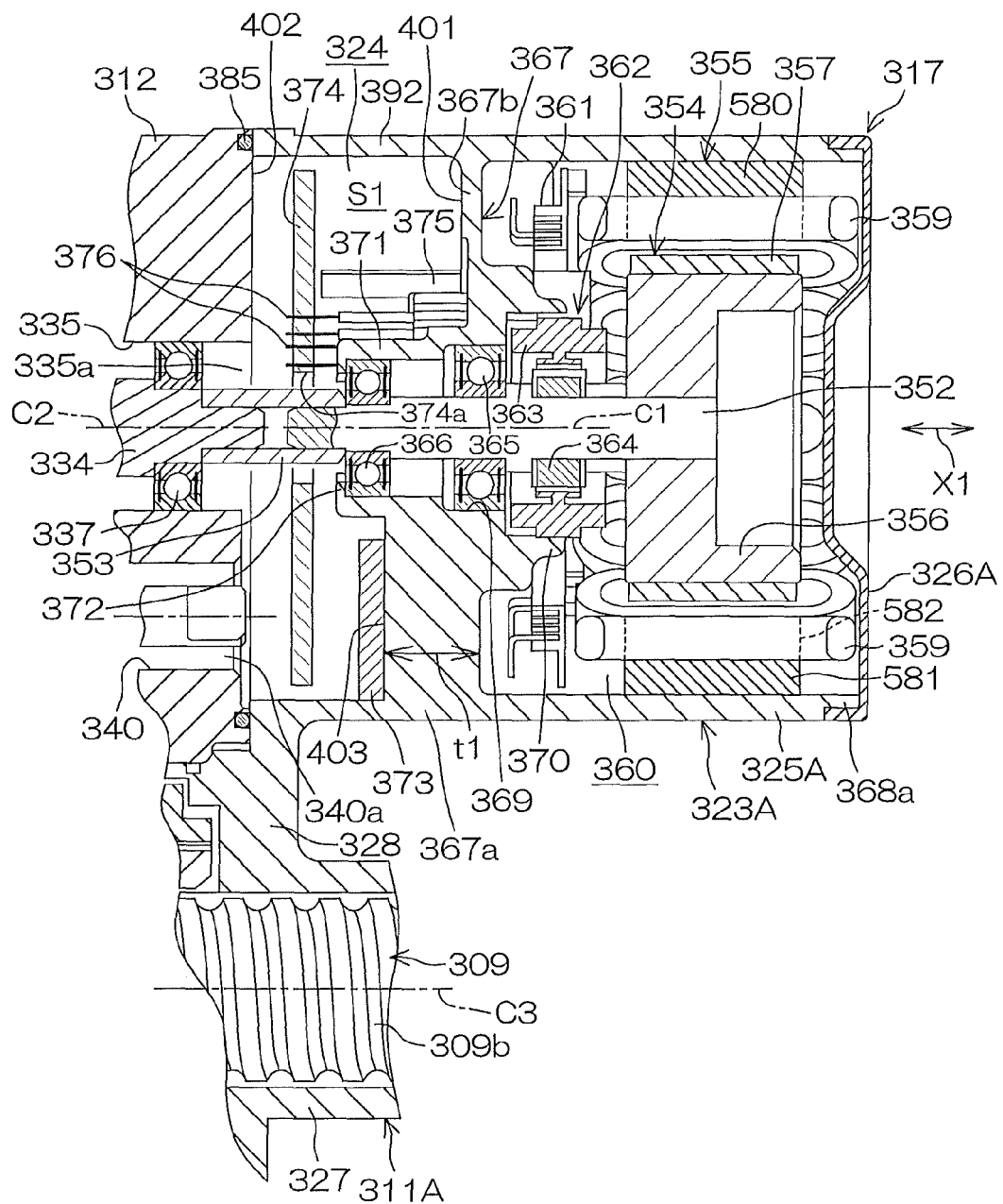
FIG. 20 is a cross-sectional view of a principal part of an electric power steering apparatus serving as a vehicle steering apparatus according to a still further embodiment of the present invention.

FIG. 20 illustrates a still further embodiment of the present invention. As illustrated in FIG. 20, a first motor housing 325A extending in an axial direction may be used as a part of a unit housing 311A, and an annular stator core 580 integrally formed of a single material may be fixed to the inner periphery of the first motor housing 325A in a press-fit manner or a shrink-fit manner to assemble a motor housing 323A.

The stator core 580 includes an annular yoke 581 integrally formed of a single material, and a plurality of teeth 582 projecting radially inward from the inner periphery of the yoke 581 and spaced apart therefrom in its circumferential direction. Coils 359 are respectively wound around the corresponding teeth 582. A second motor housing 326A that is fitted in a cylindrical projection 368a at an end of the first motor housing 325A is in a shallow cup shape. In this case, the so-called integrated stator core 580 is used so that assembling is easy. The position accuracy of poles of a stator 355 can be improved, so that the efficiency of an electric motor 317 can be improved.

The present invention is not limited to each of the above-mentioned embodiments. Various changes can be made. Although in each of the above-mentioned embodiments, the present invention is applied to an electric power steering apparatus for outputting power from an electric motor as a steering assist force, the present invention is not limited to the same. For example, the present invention may be applied to a vehicle steering apparatus of a transfer ratio variable type including a transfer ratio variable mechanism capable of changing the ratio of the steering angle of a steerable wheel to the steering angle of a steering member and using the output of the electric motor to drive the transfer ratio variable mechanism. The present invention may be applied to a steer-by-wire vehicle steering apparatus in which mechanical connection between the steering member and the steerable wheel is released to steer the steerable wheel at the output of an electric motor.

At least a part of the power substrate 78 and the control substrate 79 in the ECU 12 may be resin molded. At least a part of the power substrate 373 and the control substrate 374 in the ECU 322 may be resin molded.

Although in each of the above-mentioned embodiments, the blushless motor is used as the electric motors 18 and 317, the present invention is not limited to the same. A motor other than the blushless motor may be used as the electric motors 18 and 317.

While the invention has been described in detail with respect to specific embodiments thereof, it will be appreciated that those skilled in the art, upon attaining an understanding of the foregoing, may readily conceive of alternations to, variations of, and equivalents to these embodiments. Accordingly, the scope of the present invention should be assessed as that of the appended claims and any equivalents thereto.

This application claims priority from Japanese Patent Applications Nos. 2008-031112 and 2008-031116 filed with the Japanese Patent Office on Feb. 12, 2008 and Nos. 2008-091653 and 2008-091658 filed with the Japanese Patent Office on Mar. 31, 2008, which are hereby incorporated by reference herein in its entirety.

The invention claimed is:

1. A vehicle steering apparatus, comprising:
an electric motor including a cylindrical motor housing and a rotatable shaft;
a control device that controls the driving of the electric motor;
a first housing and a second housing that define an accommodation chamber that accommodates the control device and contact each other;
a transmission mechanism that transmits power from the electric motor to a steering mechanism;
a transmission mechanists housing that houses the transmission mechanism; and
a preload applying mechanism,
wherein the first housing is at least a part of the motor housing,
the first housing includes a first interior wall surface that partially partitions the accommodation chamber,
the second housing includes a second interior wall surface that partially partitions the accommodation chamber,
the first interior wall surface and the second interior wall surface are opposite to each other in an axial direction of the rotatable shaft,
the transmission mechanism includes a driving member coaxially connected to the rotatable shaft together rotatably via a connection member, and a driven member that is driven by the driving member,
the driving member includes a first end relatively closer to the rotatable shaft, and a second end relatively farther from the rotatable shaft,
the first end of the driving member is rotatably supported by a first bearing held in the transmission mechanism housing,
the second end of the driving member is rotatably supported by a second bearing held in the transmission mechanism housing,
the preload applying mechanism presses the second bearing, to apply a preload to the first bearing and the second bearing,
the second housing is provided in the transmission mechanism housing,
the electric motor includes a rotor that rotates together with the rotatable shaft, and a stator opposite to the rotor,
the control device is arranged between the rotor and the first bearing in the axial direction of the rotatable shaft,
the rotatable shaft includes an end connecting to the connection member,
the end of the rotatable shaft is rotatably supported by a third bearing held in the motor housing,
the control device includes a power substrate having a power circuit for supplying power to the electric motor mounted thereon, and
at least a of the power substrate and at least part of the third bearing are arranged at positions that overlap each other in the axial direction of the rotatable shaft.

2. The vehicle steering apparatus according to claim 1, further comprising
a steered state detection sensor for detecting a steered state, and
a sensor housing that houses the steered state detection sensor,
wherein the second housing is provided in the sensor housing.

3. The vehicle steering apparatus according to claim 1, wherein
the second housing includes a cylindrical section that surrounds a shaft for transmitting a steering force,
the cylindrical section is arranged within the accommodation chamber, and
an extension surface of an annular plane of the second interior wall surface contacts or intersects an outer peripheral surface of the cylindrical section.

4. The vehicle steering apparatus according to claim 1, wherein
the control device is arranged around the central axis of the rotatable shaft or the extension of the central axis.

5. The vehicle steering apparatus according to claim 1, wherein
the first housing includes a partition wall that separates the accommodation chamber and the inside of the motor housing,
the partition wall is provided with the first interior wall surface,
the power substrate is arranged in closer proximity to the first interior wall surface than to the second interior wall surface,
the partition wall includes a thick-walled section having a relatively large thickness and a thin-walled section having a relatively small thickness in the axial direction of the rotatable shaft, and
the power substrate is arranged in close proximity to or in contact with the thick-walled section.

6. The vehicle steering apparatus according to claim 1, further comprising
a steering mechanism that is driven by the electric motor via a transmission mechanism,
wherein at least a part of a housing that houses at least a part of the steering mechanism and the first housing are integrally formed of a single material.

7. The vehicle steering apparatus according to claim 6, wherein the transmission mechanism housing has an opening,
wherein the first housing is connected to the transmission mechanism housing to cover the opening of the transmission mechanism housing.

8. The vehicle steering apparatus according to claim 1, wherein
the preload applying mechanism includes a preload applying member including a first screw section provided in the transmission mechanism housing and a second screw section that is fitted in the first screw section.

9. The vehicle steering apparatus according to claim 1, wherein
the accommodation chamber is defined between the transmission mechanism housing and the first housing, and
the preload applying mechanism is arranged outside the accommodation chamber.

10. The vehicle steering apparatus according to claim 1, wherein
the power substrate is arranged between the third bearing and the rotor in the axial direction of the rotatable shaft.

11. The vehicle steering apparatus according to claim 1, wherein
the driving member and the rotatable shaft constitute an integrated shaft integrally formed of a single material,
the control device includes a control substrate including a region having a control circuit for controlling the power circuit mounted thereon, and
the region in the control substrate is arranged around the integrated shaft.

12. The vehicle steering apparatus according to claim 11, further comprising
a housing that houses the integrated shaft,
wherein the integrated shaft includes three portions ions spaced apart in the axial direction of the integrated shaft, and the three portions are supported by the housing, respectively, via corresponding bearings.

13. The vehicle steering apparatus according to claim 12, wherein the driving member includes a worm shaft, the worry shaft includes a first end relatively closer to the electric motor, and a second end relatively farther from the electric motor, and a part of the housing that houses the integrated shaft includes a driving member housing that houses the worm shaft serving as the driving member, and further comprising a sealing member that seals an area between the end of the worm shaft and the driving member housing.

14. The vehicle steering apparatus according to claim 12, wherein the worm shaft includes a first end relatively closer to the electric motor, and a second end relatively farther from the electric motor, and the rotatable shaft includes a first end relatively closer to the driving member, and a second end relatively farther from the driving member.

15. The vehicle steering apparatus according to claim 12, further comprising an urging member that urges the driving member toward the driven member.

16. The vehicle steering apparatus according to claim 12, wherein the control substrate has an insertion hole through which the integrated shaft is inserted, and the integrated shaft includes a thin shaft section arranged within the insertion hole, and a pair of thick shaft sections arranged on both sides with the thin shaft section sandwiched therebetween in the axial direction of the integrated shaft.

17. The vehicle steering apparatus according to claim 16, wherein the insertion hole opens at an edge of the control substrate.

* * * * *

UNITED STATES PATENT AND TRADEMARK OFFICE
CERTIFICATE OF CORRECTION

PATENT NO. : 8,408,353 B2
APPLICATION NO. : 12/867487
DATED : April 2, 2013
INVENTOR(S) : Shigeki Nagase et al.

It is certified that error appears in the above-identified patent and that said Letters Patent is hereby corrected as shown below:

In the Claims:

IN CLAIM 1:
Column 35, line 52:
after "at least a" and before "of the power substrate" insert --part--, and
after "and at least" and before "part of the third" insert --a--.

IN CLAIM 12:
Column 36, line 65:
delete "ions" after "three portions.".

IN CLAIM 13:
Column 37, line 6:
after "the" (first occurrence) and before "shaft" change "worry" to --worm--.

Signed and Sealed this
Twenty-first Day of May, 2013

Teresa Stanek Rea
*Acting Director of the United States Patent and Trademark Office*